(12) United States Patent
Kakutani et al.

(10) Patent No.: US 7,047,105 B2
(45) Date of Patent: May 16, 2006

(54) ROBOT CONTROLLED BY WIRELESS SIGNALS

(75) Inventors: Kazushige Kakutani, Hirakata (JP); Shin Miyaji, Kobe (JP); Naoto Tojo, Ikoma (JP); Shinya Kataoka, Hirakata (JP); Seiji Murakami, Osaka (JP); Tomoyoshi Tokumaru, Hirakata (JP); Hideaki Aoki, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 64 days.

(21) Appl. No.: 10/076,782

(22) Filed: Feb. 15, 2002

(65) Prior Publication Data
US 2002/0161480 A1 Oct. 31, 2002

(30) Foreign Application Priority Data
Feb. 16, 2001 (JP) .............................. 2001-040880
Feb. 28, 2001 (JP) .............................. 2001-055923
Apr. 12, 2001 (JP) .............................. 2001-113497

(51) Int. Cl.
*G06F 19/00* (2006.01)
(52) U.S. Cl. ........................ 700/245; 700/246; 700/250
(58) Field of Classification Search ................ 700/245, 700/257, 246, 247, 248, 249, 250; 318/568.12, 318/800; 701/23; 901/1, 46, 47
See application file for complete search history.

(56) References Cited

U.S. PATENT DOCUMENTS 4,827,395 A * 5/1989 Anders et al. .................. 700/9

6,542,788 B1 * 4/2003 Hosonuma et al. .......... 700/245
6,584,376 B1 * 6/2003 Van Kommer .............. 700/245

FOREIGN PATENT DOCUMENTS

| JP | 57-135932 | 8/1982 |
| JP | 9-294724 A1 | 11/1997 |
| JP | 10-234681 | 9/1998 |
| JP | 2001-246580 | 9/2001 |
| JP | 2002-574 | 1/2002 |
| JP | 2002-51990 | 2/2002 |
| WO | WO99/67067 | 12/1999 |

OTHER PUBLICATIONS

Breazeal et al., Infant-like social interactions between a robot an da Human caregive, 1998, Internet, pp. 1-57.*
Thrum et al., Probabilistic algorithms and the interactive museum tour-guide robot minerva, 2000, Internet, pp. 1-35.*
AIC Technology, Integrated vision, speech, & action, 1994, Internet, pp. 1-2.*

* cited by examiner

*Primary Examiner*—Thomas G. Black
*Assistant Examiner*—McDieunel Marc
(74) *Attorney, Agent, or Firm*—Darby & Darby

(57) ABSTRACT

A user communicates with a companion with his or her portable telephone attached to a telephone attachment pocket of a robot. The robot acts in accordance with a voice signal which is outputted from the portable telephone, thereby behaving as if it were speaking to the user. The robot outputs a voice in response to the user's voice which is picked up by a microphone, thereby behaving as if it were listening to the user. Owing to this robot or a robot system using the same, the user feels less odd in his or her communication using the portable telephone.

41 Claims, 30 Drawing Sheets

FIG. 10

| | IN CONVERSATION | CONVERSATION INTERRUPTION | AUTONOMIC ACTION | SLEEP | EMERGENCY |
|---|---|---|---|---|---|
| HAPPY | NOD1<br>NOD DEEP | DEMAND<br>LOOK UP MOVING BACK AND FORTH | DANCE<br>DANCE TO THE RHYTHM | SLEEP1<br>NOD WITH HEAD SLIGHTLY INCLINED UP | SURPRISE<br>BEND BODY BACK |
| SAD | NOD2<br>NOD SLIGHTLY WITH HEAD INCLINED AND EYELIDS HALF-OPENED | INDIFFERENT<br>LOOK HALF DOWN WITH EYES SLIGHTLY CLOSED AND HEAD INCLINED TO THE RIGHT | TIMID<br>TURN BACK AND STAGGER AWAY | SLEEP2<br>NOD WITH HEAD SLIGHTLY INCLINED DOWN | |
| ANGRY | NOD3<br>SHAKE HEAD MUCH AND FAST LOOKING UP | IGNORE<br>TURN HEAD ROUND SLOWLY WITHOUT MEANING | STRUGGLE<br>STAGGER AFTER TURNING ROUND AND ROUND | | |

FIG. 17

| MWSB P1 P2 | MOVE BACKWARD OVER P1 WITH SPEED P2 |
| MWSF P1 P2 | MOVE FORWARD OVER P1 WITH SPEED P2 |
| MWPB P1 P2 | WALK BACKWARD OVER P1 WITH SPEED P2 |
| MWPF P1 P2 | WALK FORWARD OVER P1 WITH SPEED P2 |
| MWCBL P1 P2 P3 | TURN LEFT WITH RADIUS P1 OVER P2 WITH SPEED P3 |
| MWCBR P1 P2 P3 | TURN RIGHT WITH RADIUS P1 OVER P2 WITH SPEED P3 |
| MNL P1 P2 | TURN HEAD UP AT ANGLE P1 WITH SPEED P2 |
| MNR P1 P2 | TURN HEAD DOWN AT ANGLE P1 WITH SPEED P2 |
| MEL P1 P2 | TURN HEAD LEFT AT ANGLE P1 WITH SPEED P2 |
| MER P1 P2 | TUEN HEAD RIGHT AT ANGLE P1 WITH SPEED P2 |
| WW | STOP MOVING |
| WWN | STOP HEAD OPERATION |
| D P1 | WAIT FOR TIME P1 |

ROBOT CONTROLLED BY WIRELESS SIGNALS

BACKGROUND OF THE INVENTION

1. Field of the Invention

The present invention relates to a robot for supporting user's daily life and a robot system which uses such a robot.

2. Description of the Related Art

A robot has been proposed which presents a shape and actions resembling those of pet animals or imaginary beings and which makes a user feel close to the robot. Such a robot with a dedicated operation program installed is capable of moving movable parts or outputting a voice in accordance with information such as a voice picked up through a microphone and images acquired with a CCD camera.

A communication apparatus such as a telephone is used for the purpose of talking with someone who is far away. Such a communication apparatus is structured so as to output the companion's voice. A dialogue with the companion using a communication apparatus is conducted generally without user's visual confirmation of the companion. In the recent years, a robot has been proposed which analyzes a speaker's voice and behaves as if it were a listener. Acting in response to the speaker's (user's) voice, such a robot makes the user feel as if the user is in conversational communication with the robot.

However, on the occasion of conversation between human beings using communication apparatuses such as telephones, the conventional robot described above can not act in response to a voice from the person on the phone (speaker). Further, the user (listener) can not visually confirm the companion. Hence, the robot above makes the user feel odd.

Further, the conventional robot can not notify a user who is far away of the state inside the house. Hence, to allow the user to monitor inside the house, it is necessary to install an expensive monitoring system.

In addition, although the operation program installed in the conventional robot can be modified on a minor scale, the conventional robot can not operate based on a totally new operation program.

Further, as an operation program to be realized is largely modified in the conventional robot, a controller controlling intended actions can not remain accommodating, and therefore, desired actions can not be realized unless almost all structural elements are modified.

Further, the conventional robot is not capable of outputting a voice or behaving in accordance with the user's mental condition, such as happy, sad or angry feeling.

Apparatuses installed in a house, such as an air conditioner, a television set and a washing machine, are equipped with indicating lamps for notifying the residents of malfunction. However, to notify the residents of malfunction, the residents need come close to these apparatuses.

Further, in a house, owing to the resident's habit in his or her everyday life, the apparatuses which are set within the house are manipulated in most cases in an approximately regular manner approximately at the regular time, e.g., an air conditioner is activated at about 9 p.m. every day. To operate the apparatuses, the resident needs manipulate the apparatuses every time.

BRIEF SUMMARY OF THE INVENTION

The present invention has been made with the aim of solving the above problem, and an object thereof is to provide a robot which behaves as if it were a companion in conversation while looking at a user (listener) and therefore does not make the user feel odd when communicating with the user, and to provide a robot system using such a robot.

Another object of the present invention is to provide a robot which acts in response to a voice of a person on the phone and accordingly behaves as if it were a speaker when a voice or a voice signal is outputted from a communication apparatus, while appropriately responds to what a user says and accordingly behaves as if it were a listener when the user's voice is received by a voice input unit, and to provide a robot system using such a robot.

Still another object of the present invention is to provide a robot which is capable of acting in accordance with instructions from an external communication apparatus and notifying a user who is far away of the state within a house, and to provide a robot system using such a robot.

Further object of the present invention is to provide a robot which is capable of downloading a CM-operation program registered in an external server apparatus through a communication network, e.g., on Internet lines.

Yet further object of the present invention is to provide a robot which is capable of easily realizing a hardware structure designed for a desired application by modifying an FPGA program by means of a general-purpose hardware structure, in accordance with a control mode, such as torque control and speed control, of a motor required for the application.

Another object of the present invention is to provide a robot which outputs a voice which matches with a mental condition of a user in user's life and accordingly makes the user feel close to the robot, and to provide a robot system using such a robot.

Yet another object of the present invention is to provide a robot which manipulates external apparatuses in accordance with the user's habit in his or her everyday life so that the robot saves the trouble for the user even if the user does not manipulate the external apparatuses in an approximately regular manner approximately at the regular time every day.

A robot system according to the present invention comprises: a robot; and a communication apparatus which receives a voice signal and outputs a voice or voice signal which corresponds to the received voice signal. The robot comprises: at least one movable unit; an imaging unit; and an input unit which accepts the voice or voice signal from the communication apparatus which receives the voice signal and outputs the voice or voice signal which corresponds to the received voice signal. The robot comprises a control unit which drives the movable unit based on the voice or voice signal inputted at the input unit and outputted from the communication apparatus and an image captured by the imaging unit.

In this robot or robot system, the control unit drives the movable unit of the robot in a controlled manner based on the voice or voice signal outputted from the communication apparatus such as a portable telephone, and the image captured by the imaging unit. Hence, the robot can behave as if it were a companion to a user (listener) while looking at the user, which makes the user feel less odd during the communication.

A robot according to the present invention comprises: at least one movable unit; a voice input unit; a voice output unit; and an input unit which accepts a voice or voice signal from a communication apparatus which receives a voice signal and outputs a voice or voice signal which corresponds to the received voice signal. The robot comprises: a control unit which drives the movable unit based on the voice or voice signal outputted from the communication apparatus; and a voice determining unit which determines a voice to be outputted based on the voice which is inputted at the voice input unit. The voice output unit outputs the voice which is determined by the voice determining unit.

In this robot or robot system, the control unit drives the movable unit of the robot in a controlled manner based on the voice or voice signal outputted from the communication apparatus. Hence, the robot can behave as if it were a speaker. Further, in this robot or robot system, the voice determining unit determines a voice which corresponds to the voice which is inputted at the voice input unit, and the voice output unit outputs thus determined voice. Hence, the robot can behave as if it were a listener, responding appropriately to the user who is speaking to the robot. As a result, not only when the user is speaking to the user but also when the user is communicating with someone else, it is possible to make the user feel as if the user were having conversation with the robot and hence make the user feel less odd.

A robot system according to the present invention comprises: the robot; and the communication apparatus which receives the voice signal and outputs the voice or voice signal which corresponds to the received voice signal. The robot further comprises an imaging unit, and the control unit drives the movable unit based on an image captured by the imaging unit.

In this robot and the robot system using this robot, the imaging unit captures an image around the robot, and the movable unit is driven in a controlled manner based on thus obtained image such that the user is located at the center in the image. Hence, it is possible to have the robot faced to the user, and therefore, both when the user is speaking to the robot and when the user is communicating with someone else, it is possible to make the user feel much less odd.

A robot system according to the present invention comprises the robot and the communication apparatus, and the communication apparatus comprises: a first receiving unit which receives from outside first action instructing information which expresses an instruction regarding an action of the movable unit; a first transmission unit which transmits to the robot second action instructing information which corresponds to the first action instructing information which is received by the first receiving unit; a second receiving unit which receives first image information which expresses an image which is transmitted from the robot; and a second transmission unit which transmits to outside second image information which corresponds to the first image information which is received by the second receiving unit. The robot comprises: at least one movable unit; an imaging unit; a third receiving unit which receives the second action instructing information from the communication apparatus; a control unit which drives the movable unit based on the second action instructing information which is received by the third receiving unit; and a third transmission unit which transmits the first image information to the communication apparatus based on the image captured by the imaging unit.

In the robot and the robot system, the first action instructing information which instructs an action of the robot is transmitted from outside, the first action instructing information is received by the communication apparatus which is installed within a building and transmitted to the robot as the second action instructing information (action instructing information), and each movable unit of the robot is driven in a controlled manner based on the second action instructing information (action instructing information). Hence, a user who is far away can remotely operate the robot from outside. Further, in the robot and the robot system, the image captured by the imaging unit of the robot is transmitted as the first image information (image information) from the robot to the communication apparatus, and the second image information corresponding to the first image information (image information) is transmitted to outside from the communication apparatus. Hence, a user who is far away can get notified of the state inside his or her house. This allows the user to monitor inside the house without introducing an expensive monitoring system.

The robot according to the present invention acquires an operation program to a memory from an external server apparatus through a communication network.

A desired CM-operation program can be easily loaded into the robot from a web page of a company for instance. In addition, the robot can express information based on the CM-operation program as an action thereof.

The robot according to the present invention comprises a programmable controller which can modify by means of program a hardware structure which is for supplying a control signal to a drive circuit.

By modifying a program of the programmable controller, the drive circuit of a motor which operates the movable units of the robot can easily set up control of voltage, control of current, etc. Hence, it is easy to modify torque control, speed control and the like of the motor in accordance with a purpose.

A robot according to the present invention comprises: a receiving unit which receives information from outside; a voice determining unit which determines a voice based on the information received by the receiving unit; and a voice output unit which outputs the voice determined by the voice determining unit. The information contains information regarding everyday life of a target person.

In this robot, information corresponding to the condition of the user (mental condition) collected by a portable apparatus which the user brings with him or her is received by the receiving unit, and the voice determining unit determines a voice based on this information, and therefore, it is possible to output a voice which fits with the user's mental condition. Hence, when the target's (user's) heart rate is high for instance, it is possible to determine that the user is feeling tense. When the user's portable telephone has received many incoming calls, it is possible to determine that the user is feeling busy. Further, the robot determines a voice based on information regarding everyday life of a target person (user). Hence, when the user has walked many steps in one day for example, the robot outputs a voice praising the user and makes the user feel pleased and even closer to the robot.

A robot according to the present invention comprises: a memory unit which stores manipulation history information regarding the history of manipulation given by a target person to an external apparatus; and an operation unit which manipulates the external apparatus based on the manipulation history information stored in the memory unit.

The robot can operate the external apparatus in accordance with the target's (user's) habits in his or her everyday life. The user does not need to manipulate the external apparatus through approximately constant manipulation approximately at the same time of a day every day, and thus, and the robot saves the troubles for the user.

A robot according to the present invention further comprises: a receiving unit which receives the information transmitted from the external apparatus; and a voice output unit which outputs a voice based on the information received by the receiving unit. The operation unit manipulates the external apparatus when the manipulation history information is information which indicates that information was received from a particular sender approximately at the same time of a day over a couple of days, so that the external apparatus receives information from the particular sender at the time corresponding to the time of a day after these past few days and the external apparatus transmits thus received information .

Even when the user does not manipulate the external apparatus, the robot collects information from the particular sender at the time of a day every day in accordance with the user's habits in his or her everyday life and the robot notifies the user of this by means of a voice. Hence, it is not necessary for a user to manipulate the external apparatus to receive information from the particular sender at the time of a day every day, whereby the trouble is saved for the user.

The above and further objects and features of the invention will more fully be apparent from the following detailed description with accompanying drawings.

BRIEF DESCRIPTION OF THE SEVERAL VIEWS OF THE DRAWINGS

FIG. 10 is a reply operation table for describing operations of a reply operation controller 160;

FIG. 17 is a chart showing one example of command data for a robot;

DETAILED DESCRIPTION OF THE INVENTION

The following description will explain the present invention in detail with reference to the drawings illustrating some embodiments thereof.

FIRST EMBODIMENT

Figure 1:
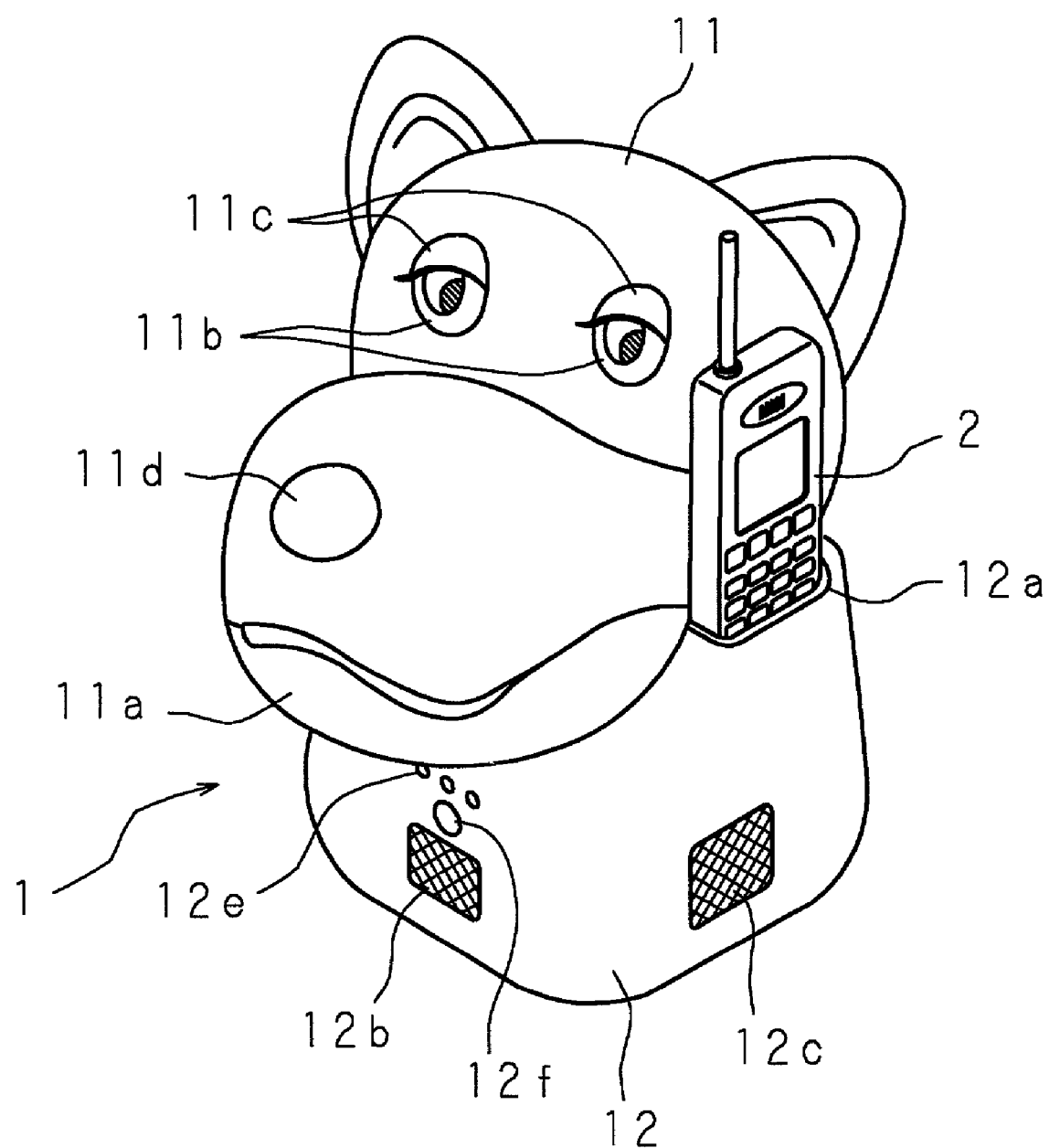
FIG. 1 is a perspective view showing an essential structure of a first embodiment of a robot according to the present invention.
Figure 2:
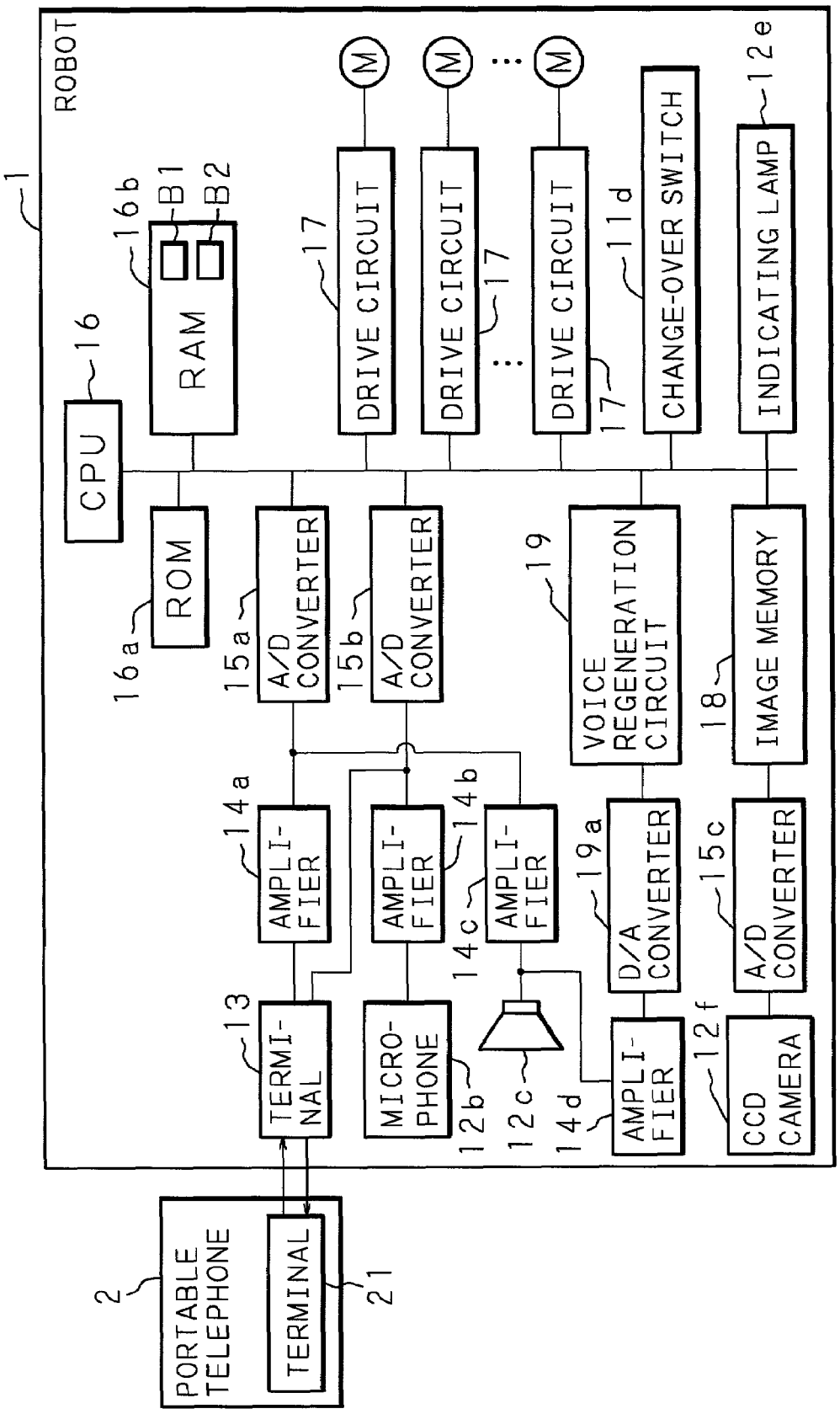
FIG. 2 is a block diagram showing the essential structure of the first embodiment of the robot according to the present invention.

FIGS. 1 and 2 are a perspective view and a block diagram showing an essential structure of a first embodiment of a robot according to the present invention. In FIGS. 1 and 2, denoted at 1 is a robot and denoted at 2 is a portable telephone machine (communication apparatus). The robot 1 has an outer shell of plastic or fabric, etc., and a shape resembling a pet animal, an imaginary animal or the like. The robot 1 is formed by a head portion 11 and a trunk portion 12 and internally comprises operation mechanisms (not shown) which include a plurality of motors M, M, . . . M for a nodding action in which the head portion 11 sways in an up/down direction, a shaking action in which the head portion 11 shakes in a left/right direction, an open/close action in which a mouth 11a formed at the head portion 11 opens and closes, an action of eye balls 11b and 11b formed at the head portion 11 in which the eye balls 11b and 11b roll in the up/down direction and the left/right direction, a blinking action in which eyelids 11c and 11c swing in the up/down direction and a traveling action in which the robot 1 travels as wheels not shown disposed to the trunk portion 12 roll.

Figure 3:
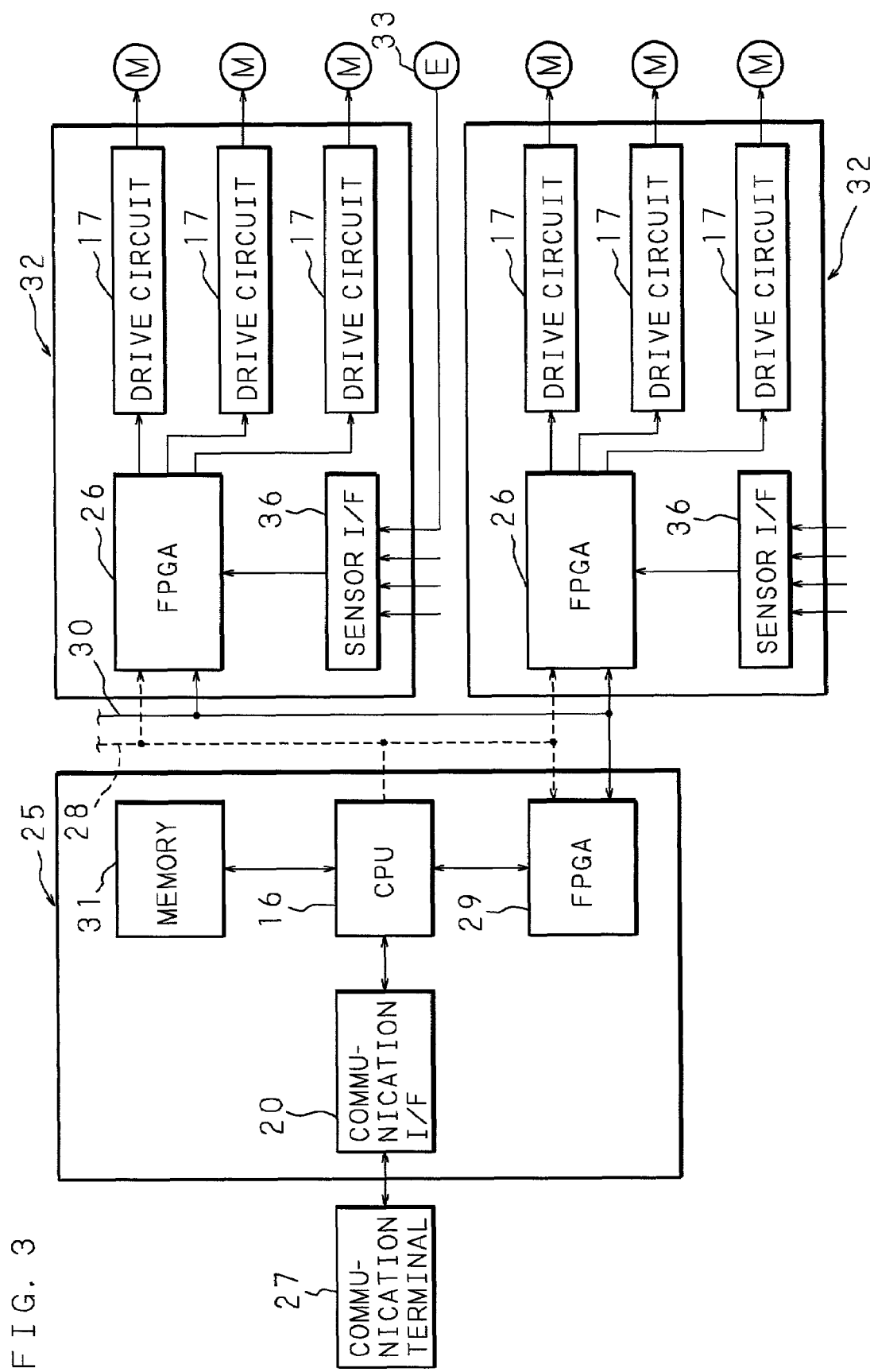
FIG. 3 is a block diagram showing a hardware structure of a control apparatus of a robot which is capable of modifying an operation program.

A hardware structure of a control apparatus of the robot which is capable of modifying an operation program will be described with reference to FIG. 3. In FIG. 3, the control apparatus comprises a main control board 25 having a capability of high-order calculation and a plurality of outer connection boards 32, 32.

The main control board 25 seats a CPU 16, a communication interface 20 which enables connection with external equipment, a network or a personal communication terminal 27 such as a portable telephone, a programmable device 29 which is bus-connected with the plurality of outer connection boards 32 and whose internal logic calculation circuit can be re-written by the CPU 16 by means of the configuration, and a memory 31 which is connected with the CPU 16.

The programmable device 29 is an FPGA (Field Programmable Gate Array) or the like whose internal architecture is an SRAM structure for instance, and is commercially available from ALTERA, XILINX or the like.

Meanwhile, the memory 31 is formed by a non-volatile memory, such as a flash memory, which stores data needed to configure the FPGA 29, the program in the CPU 16 and the like, and a RAM which stores data which are used by the CPU 16 for execution of the program.

Each outer connection boards 32 bus-connected with the main control board 25 mounts an FPGA 26 which serves as a programmable device, and the internal logic calculation circuit of the FPGA 26 is formed in accordance with configuration data transmitted through a dedicated control signal bus 28.

A connection bus 30 which connects the FPGA 29 and 26 mounted on the main control board 25 and the respective outer connection boards 32 to each other includes data, a control signal and a power source line.

The outer connection boards 32 mounts a general-purpose sensor interface 36 which is capable of accepting digital pulses and analog voltage signals from a potentiometer and other force sensors which measure a deviation at the last stage through an encoder 33, which is connected with the motors M which activate operational portions of the robot for example, a reducer and the like. It is via this sensor interface 36 that control signals are accepted by the FPGAs 26.

Connected between each motor M and each FPGA 26 is a drive circuit 17 which controls a voltage to be applied to the motor M based on an instruction value from the FPGA 26. The drive circuit 17 uses PWM control or the like which requires repeated switching at a predetermined frequency (about 16 kHz) from the FPGA 26 and allows to control a duty within one cycle (a ratio of the ON-state in which a voltage is applied, to the OFF-state in which a voltage is not applied).

Having the bus structure denoted at the dotted and the solid lines in FIG. 3, a plurality of outer connection boards 32 can be connected which have the same structure in accordance with the number of the motors M used by the application. In this case, IDs for distinguishing the boards can be set by disposing a jumper pin on the board or directly writing the IDs in the configuration data of the FPGAs 26.

Further, the outer connection boards 32 can connect not only with boards for driving the motors and having the same structure but with image input and output boards, voice input and output boards and the like in accordance with the necessity associated due to the application.

A telephone attachment pocket 12a which is to receive a portable telephone 2 is formed in a side portion of the trunk portion 12. In the vicinity of the telephone attachment pocket 12a, there is a connecting terminal 13 which is connected with a connecting terminal 21 disposed to a side portion of the portable telephone 2. The connecting terminal 13 is connected with the CPU 16 via an amplifier 14a and an AID converter 15a. The amplifier 14a is connected with another amplifier 14c as well, and the amplifier 14c is connected with a speaker 12c which is disposed to the side portion of the trunk portion 12.

Owing to this, a voice signal representing a voice from a companion (a person on the phone) outputted from the connecting terminal 21 of the portable telephone 2 is received by the robot 1 at the connecting terminal 13 and then amplified by the amplifier 14a. The voice signal outputted from the amplifier 14a is converted by the A/D converter 15a into a digital signal and supplied to the CPU 16, and after amplified by the amplifier 14c, outputted from the speaker 12c as an audible sound.

A microphone 12b is disposed to the front of the trunk portion 12 of the robot 1. The microphone 12b is connected with the CPU 16 via an amplifier 14b and an A/D converter 15b. The amplifier 14b is connected with the connecting terminal 13, so that a signal outputted from the amplifier 14b is outputted to the portable telephone 2 at the connecting terminal 13.

A voice of a user in the vicinity of the robot 1 is converted by the microphone 12b into an analog voice signal. The voice signal is amplified by the amplifier 14b. Outputted from the amplifier 14b, the voice signal is converted by the A/D converter 15b into a digital signal and supplied to the CPU 16 while outputted to the portable telephone 2 at the connecting terminal 13.

The A/D converters 15a and 15b each perform sampling every 8 ms, thereby converting an analog signal into a digital signal.

The CPU 16 is connected with the plurality of drive circuits 17, 17, . . . 17. The drive circuits 17 are connected with the motors M respectively. The motors M are driven by the drive circuits 17.

The CPU 16 is also connected with a voice regeneration circuit 19. A ROM storing a plurality piece of voice data is incorporated in the voice regeneration circuit 19. In accordance with a control signal outputted from the CPU 16, the voice regeneration circuit 19 reads the voice data from the ROM and outputs a digital voice signal. The voice regeneration circuit 19 is connected with a D/A converter 19a. The D/A converter 19a is connected with the speaker 12c via an amplifier 14d. A voice signal outputted from the voice regeneration circuit 19 is converted by the D/A converter 19a into an analog signal. After amplified to a predetermined level by the amplifier 14d, the converted voice signal is supplied to the speaker 12c and outputted as an audible sound.

A change-over switch lid for manually switching between a speaker mode and a listener mode which will be described later is disposed to a nose portion of the robot 1. A CCD camera 12f is disposed above the microphone 12b of the trunk portion 12. The CCD camera 12f captures a front image of the robot 1. The CCD camera 12f is connected with an A/D converter 15c. The A/D converter 15c is connected with an image memory 18. The image memory 18 is connected with the CPU 16.

As the CCD camera 12f captures the surrounding image, an analog signal representing the image is outputted from the CCD camera 12f. Thus outputted analog signal is converted by the A/D converter 15c into a digital signal and stored in the image memory 18 as digital data of the image (image data). The stored image data are supplied to the CPU and used for processing which will be described later.

An indicating lamp 12e for notifying a user of whether it is the speaker mode or the listener mode is disposed above the CCD camera 12f. The indicating lamp 12e is connected with the CPU 16, and the indicating lamp 16 is turned on or off in response to a control signal from the CPU 16.

The CPU 16 is connected with a ROM 16a which stores a program for executing the processing which will be described later, and with a RAM 16b which stores data which are temporarily created during execution of the program by the CPU 16.

Figure 4:
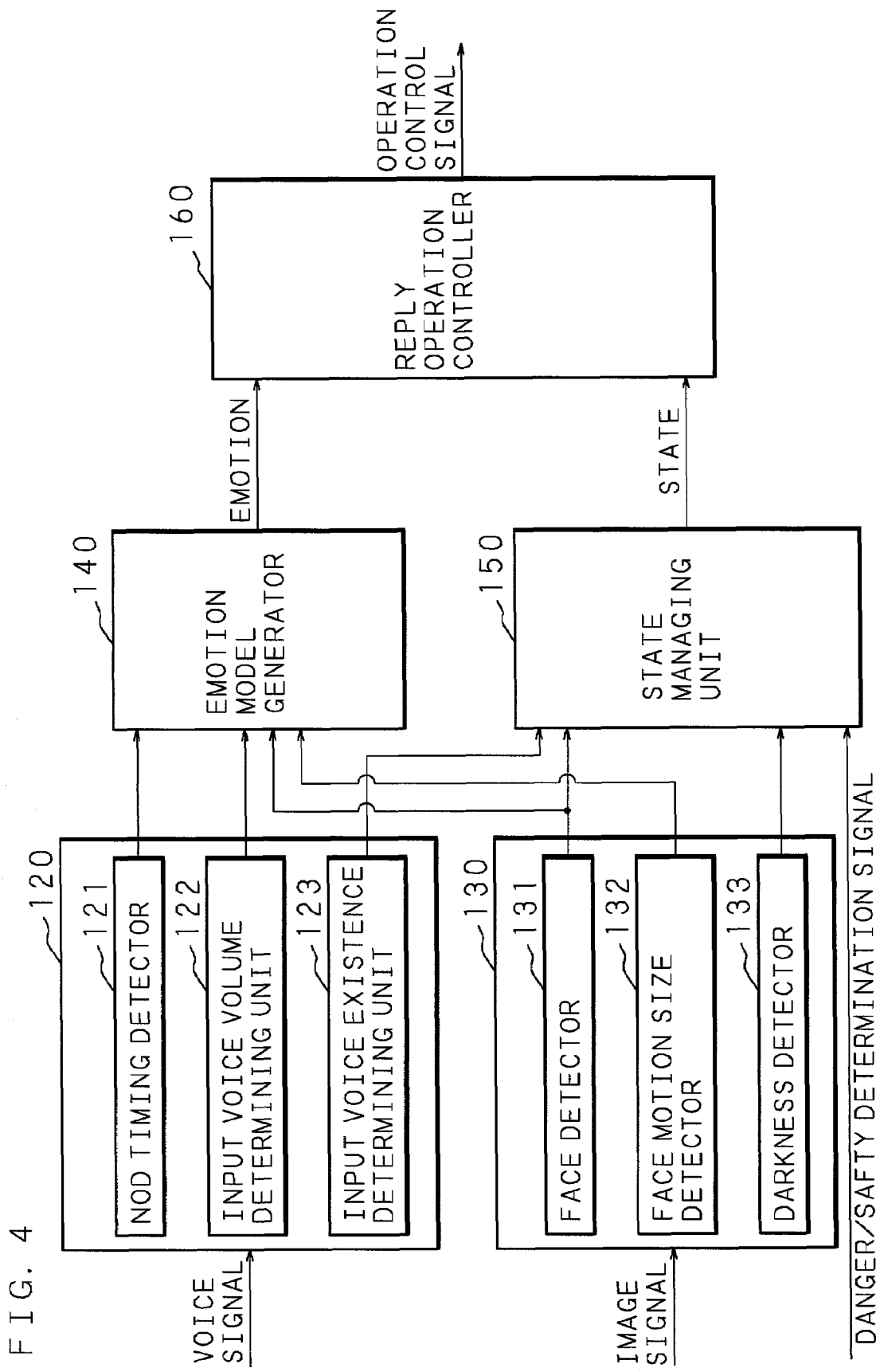
FIG. 4 is an explanatory diagram of functions of a CPU.

FIG. 4 is an explanatory diagram of functions of the CPU 16.

The CPU 16 comprises a voice processor 120, an image processor 130, an emotion model generator 140, a state managing unit 150 and a reply operation controller 160. The voice processor 120 comprises a nod timing detector 121, an input voice volume determining unit 122 and an input voice existence determining unit 123. The image processor 130 comprises a face detector 131, a face motion size detecting unit 132 and a darkness detector 133.

The emotion model generator 140 judges whether the robot is happy, sad or angry. The state managing unit 150 determines an interaction state of the robot. The reply operation controller 160 determines an action which corresponds to a combination of the current emotion of the robot determined by the emotion model generator 140 and the current interaction state determined by the state managing unit 150. The action determined by the reply operation controller 160 is realized as a signal is fed to the respective drive circuits 17.

The robot 1 can be set to an operation mode. When the operation mode is set to the speaker mode, the robot 1 is controlled so as to behave as if it were speaking to the user in tune with a voice of the companion in accordance with the voice signal outputted from the portable telephone 2. When the operation mode is set to the listener mode, the robot 1 is controlled so as to behave as if it were listening to the user in tune with the user's voice in accordance with the voice signal outputted from the microphone 12*b*.

Figure 5:
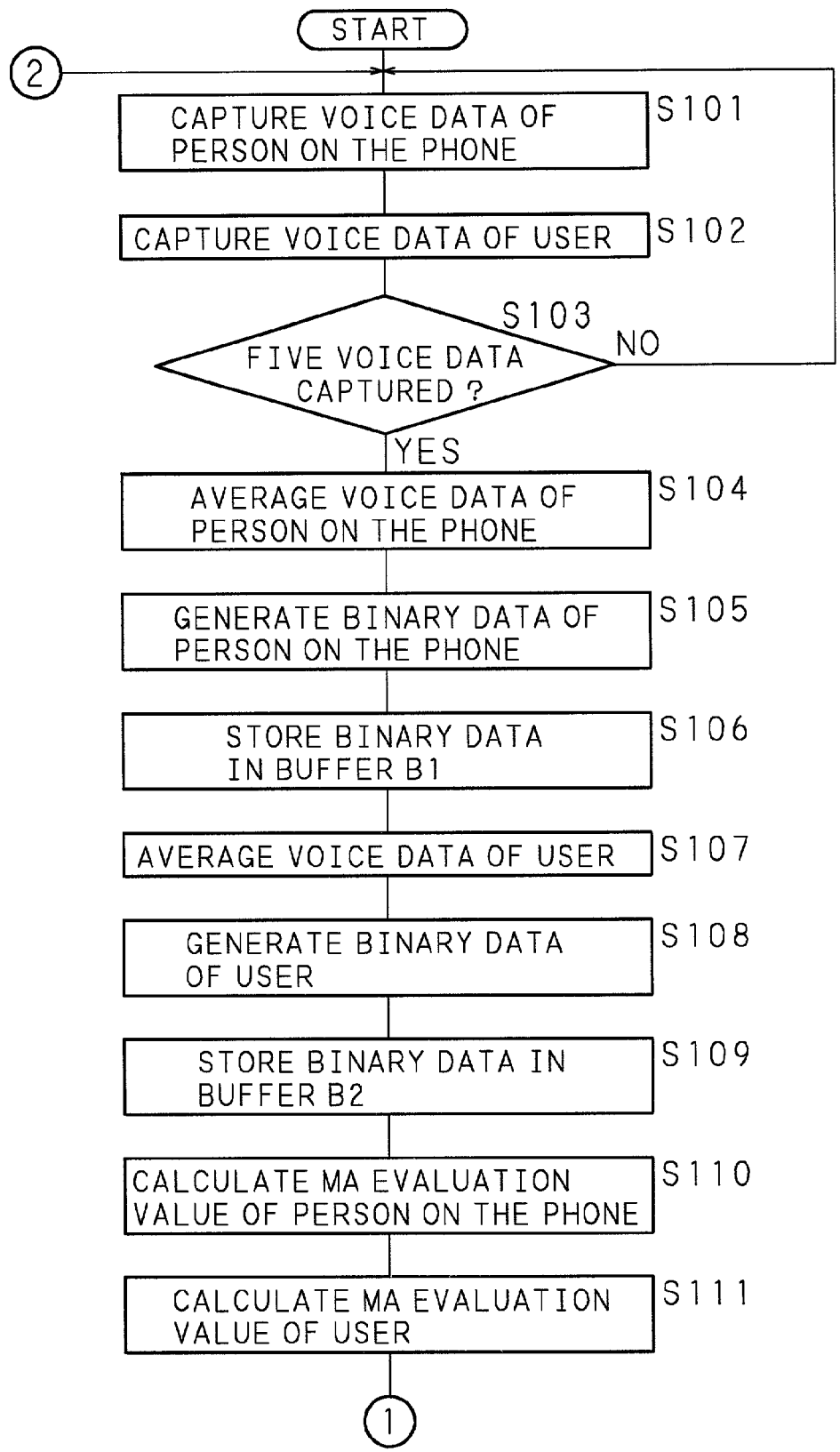
FIGS. 5 and 6 are flow charts showing the sequence of processing in the CPU for setting up of an operation mode of the robot according to the first embodiment.
Figure 6:
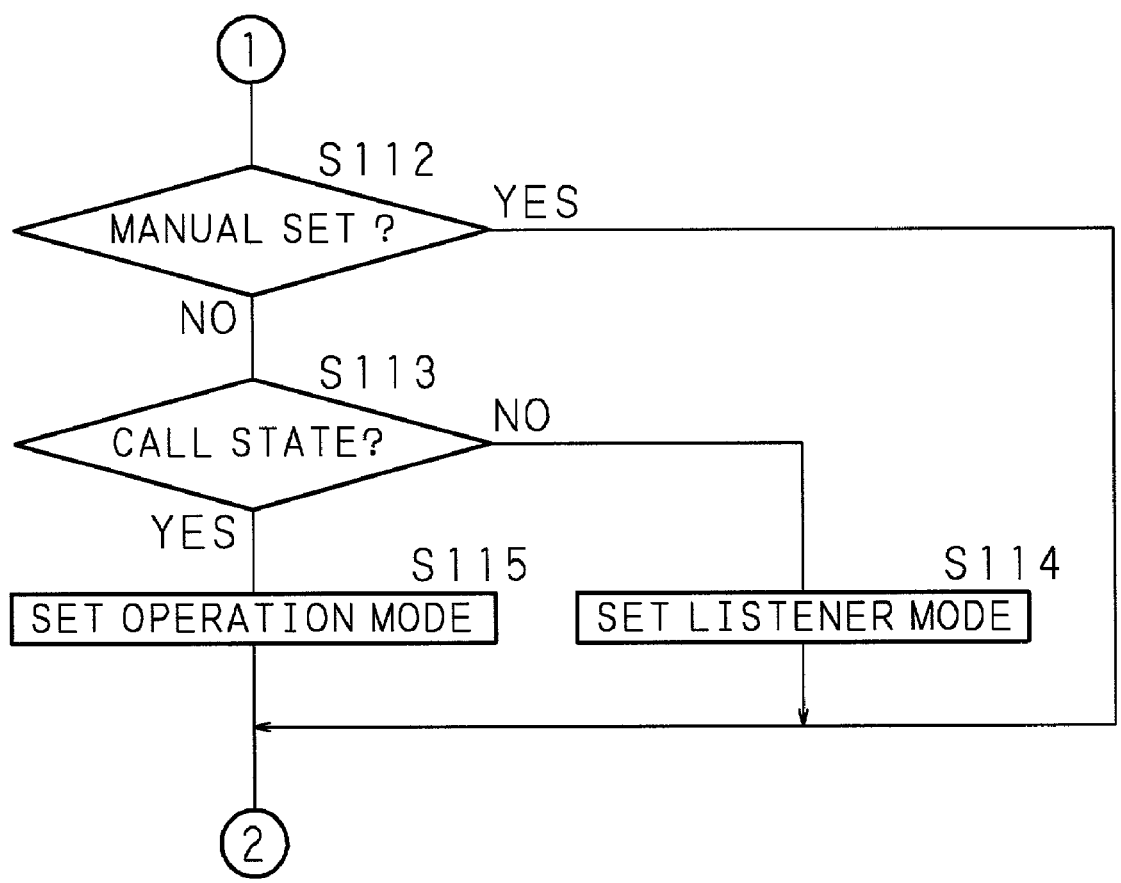

FIGS. 5 and 6 are flow charts showing the sequence of processing in the CPU 16 for setting up of the operation mode of the robot, according to the first embodiment. The CPU 16 captures the digital signal, namely, voice data outputted from the A/D converter 15*a* (Step 101), and captures the voice data outputted from the A/D converter 15*b* (Step 102). The CPU 16 judges whether the digital signals equivalent to 40 ms, i.e., five pieces of the voice data are captured or not (Step 103), and returns to the step 101 upon failed loading.

When capturing five pieces of the voice data, the CPU 16 calculates an average of the five pieces of the voice data representing the companion supplied at the step 101 (Step 104) and generates binary data from the calculated average value (Step 105). More specifically, the average value is compared with a predetermined threshold. When the average value is over the threshold, the binary data has a value of 1. When the average value is not over the threshold, the binary data has a value of 0. The binary data are stored in an FIFO-type buffer B1 which is capable of storing 1.6 sec-volume of binary data (Step 106). The buffer B1 is formed in a predetermined area within the RAM 16*b*.

In a similar manner, an average of the five pieces of the voice data regarding the user supplied at the step 102 is calculated (Step 107), binary data are generated using the calculated average value and a threshold different from the above threshold (Step 108), and the binary data are stored in a buffer B2 which is similar to the buffer B1 (Step 109).

An MA evaluation value of the companion is calculated from the binary data within the buffer B1 (Step 110). The MA evaluation value is calculated as the sum of products is calculated from the binary data and a predetermined group of MA factors based on an MA model.

In a similar manner, an MA evaluation value of the user is calculated from the binary data within the buffer B2 (Step 111). The group of MA factors used at the step 110 is different from the group of MA factors used at the step 111.

The CPU 16 thereafter detects the state of the change-over switch 11*d* and judges whether the operation mode is manually set (Step 112). When the operation mode is not set manually, the CPU 16 checks whether there is a signal outputted from the connecting terminal 21 of the portable telephone 2, i.e., whether there is a signal outputted from the A/D converter 15*a*, and thus judges whether the portable telephone 2 is handling a call (Step 113). When the portable telephone 2 is not in a call state, the operation mode is set to the listener mode (Step 114).

When the portable telephone 2 is in a call state, the MA evaluation value of the companion is compared with the MA evaluation value of the user, and the operation mode is set (Step 115). More specifically, the level of the MA evaluation value of the companion is compared with the level of the MA evaluation value of the user, for example. When the MA evaluation value of the companion is equal to or larger than the MA evaluation value of the user, the CPU 16 invokes the speaker mode. When the MA evaluation value of the companion is smaller than the MA evaluation value of the user, the CPU 16 invokes the listener mode. The procedure then returns to the step 101.

Figure 7:
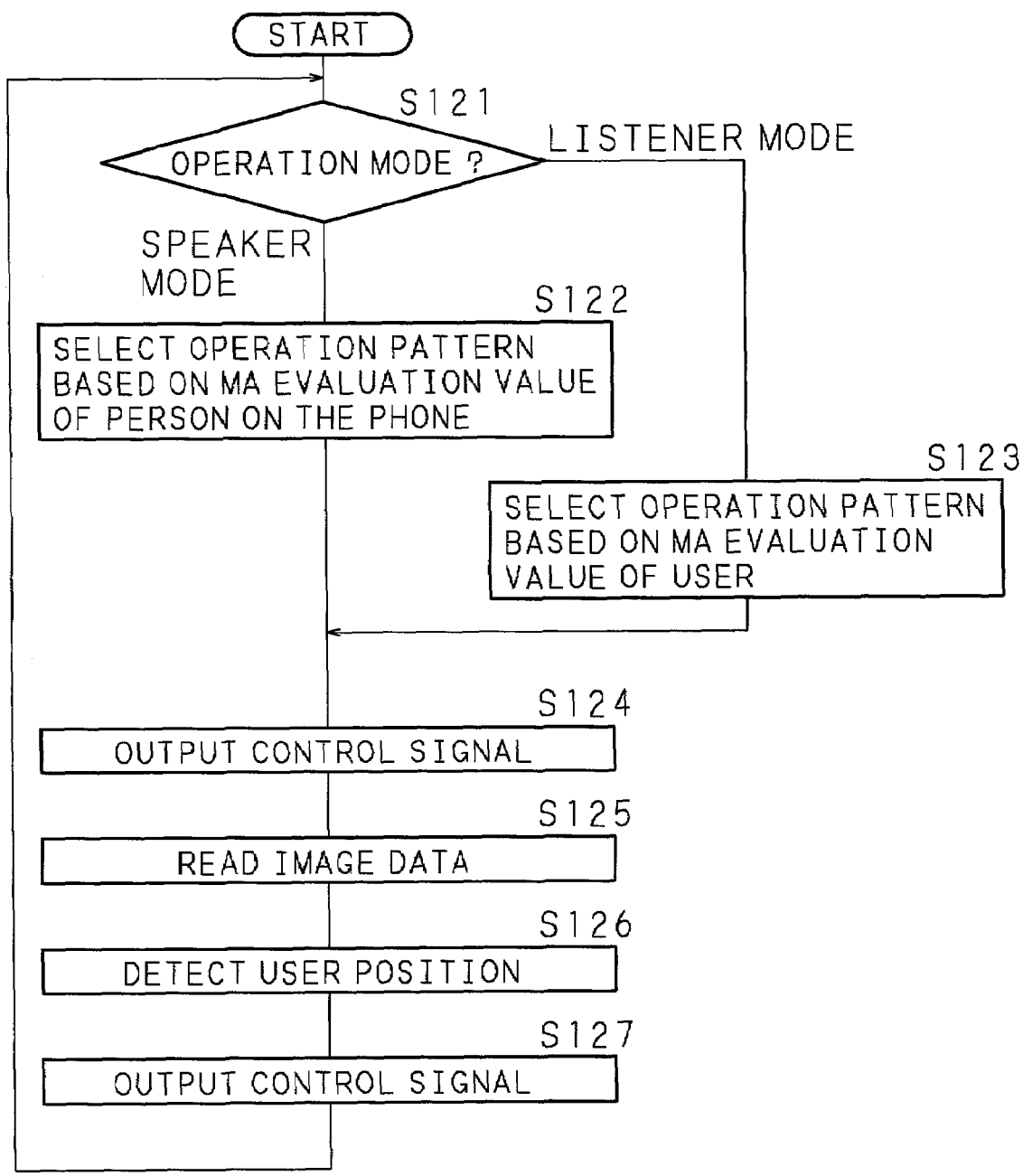
FIG. 7 is a flow chart showing the sequence of processing in the CPU for control of actions by the robot according to the first embodiment.

FIG. 7 is a flow chart showing the sequence of processing in the CPU 16 for control of actions by the robot 1 according to the first embodiment. The CPU 16 judges to which mode the operation mode is currently set (Step 121). When the operation mode is set to the speaker mode, based on the MA evaluation value of the companion calculated through the processing shown in the flow charts in FIGS. 5 and 6, the CPU 16 selects one of the plurality of operation patterns of the robot 1 (Step 122), and proceeds to the step 124. During the processing at the step 122, the CPU compares the MA evaluation value of the companion with a plurality of thresholds and selects the operation patterns associated with the respective thresholds. For instance, when the MA evaluation value of the companion is over the threshold which is for activating a blinking action, the CPU selects the operation pattern that the eyelids 11*c* swing in the up/down direction. Further, when the MA evaluation value of the companion is over the threshold for opening and closing the mouth 11*a* which is larger than the threshold for the blinking action, for example, the CPU selects the operation pattern that the mouth 11*a* opens and closes.

At the step 121, when the operation mode is currently set to the listener mode, based on the MA evaluation value of the user, one of the plurality of operation patterns of the robot 1 is selected (Step 123), and the procedure proceeds to the step 124. In processing at the step 123, the MA evaluation value of the user is compared with a plurality of thresholds and the operation patterns associated with the respective thresholds are selected. For instance, when the MA evaluation value of the user is over the threshold which is for activating a nodding action, the operation pattern that the head portion 11 sways in the up/down direction is selected. Meanwhile, when the MA evaluation value of the user is beyond the threshold which is for activating an agreeing action which is larger than the threshold for the nodding action, the operation pattern that the mouth 11*a* opens and closes and a voice saying, "Yeah, yeah," comes out is selected.

Next, a control signal which calls for an action corresponding to the selected operation pattern is outputted to the drive circuits 17 or the voice regeneration circuit 19 (Step 124). During this processing, when the operation pattern that the mouth 11*a* opens and closes is selected for instance, a control signal which instructs the mouth 11*a* to open and close is supplied to the drive circuit 17 which drives the motor M which is linked with an action mechanism of the mouth 11*a*. Meanwhile, when the operation pattern for the agreeing action is selected for example, a control signal which instructs the mouth 11*a* to open and close is supplied to the drive circuit 17 and a control signal which demands outputting of a voice saying, "Yeah, yeah," is supplied to the voice regeneration circuit 19.

The CPU 16 reads the image data acquired by the CCD camera 12f out of the image memory 18 (Step 125). As the image data are treated with image processing, the CPU 16 detects the position of the user within the image (Step 126). Based on the detected position of the user, the CPU 16 outputs a control signal to the drive circuits 17, 17 which drive the motors M, M which are linked to an action mechanism of the wheels disposed in a lower section of the robot 1 such that the robot 1 moves to face the user (Step 127), and returns to the step 121.

The processing shown in the flow charts in FIGS. 5 and 6 and the processing shown in the flow chart in FIG. 7 described above are executed in a predetermined cycle through multi-task processing by the CPU 16.

Operations of the respective portions of the CPU which determine the actions of the robot will now be described in detail.

Figure 8:
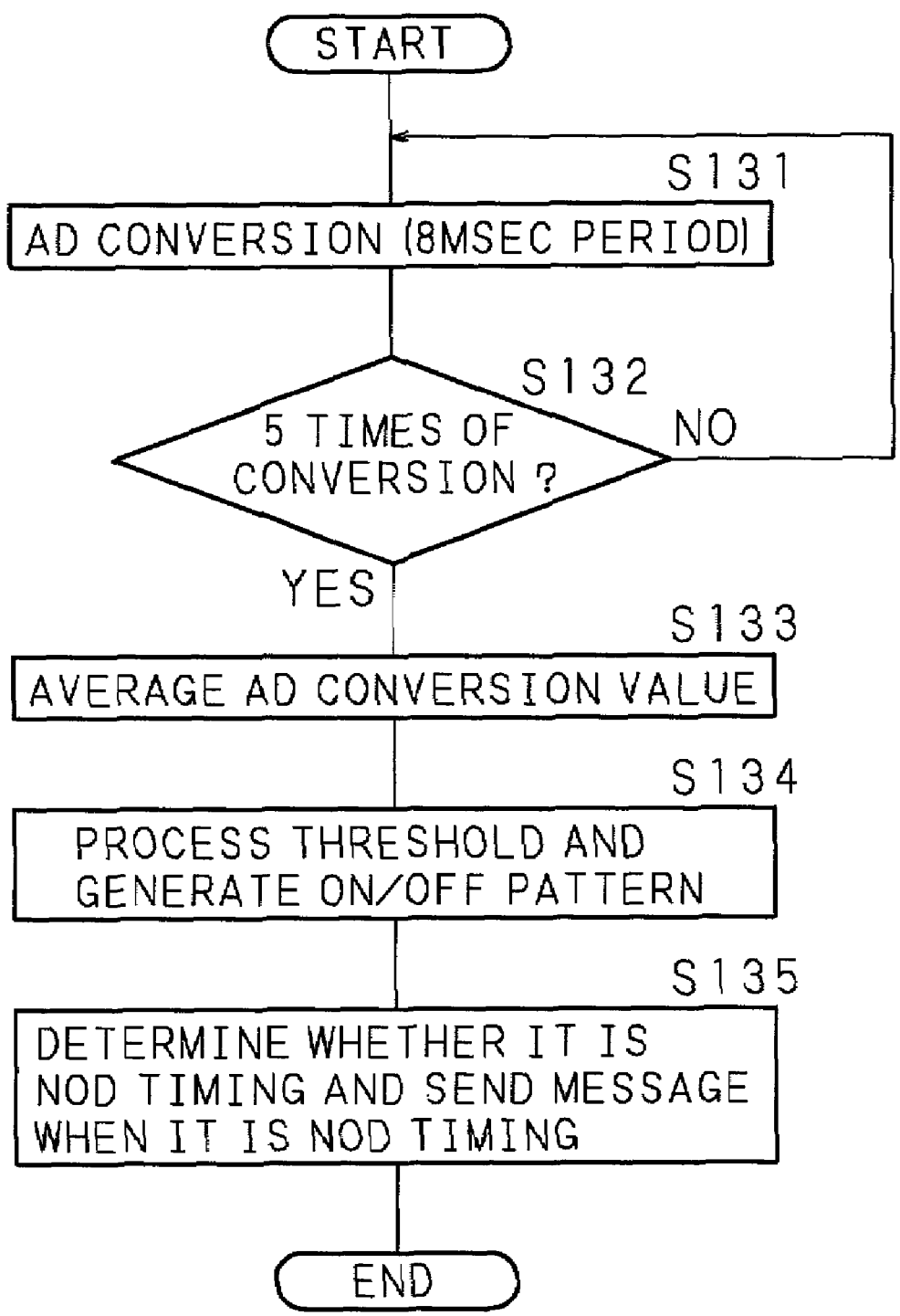
FIG. 8 is a flow chart showing the sequence of processing in a nod timing detector 121.

FIG. 8 is a flow chart showing the sequence of processing in the nod timing detector 121.

First, the analog voice signal supplied from the microphone 12b is A/D converted in a cycle of 8 msec (Step 131). Every time five conversions are made, i.e., for every cycle of 40 ms (Step 132), an average value of AD conversion values over the five conversions is calculated (Step 133). As thus obtained average value is threshold processed using an ON/OFF threshold, a time-series ON/OFF pattern over the past 1.6 sec is generated (Step 134).

Using a linear prediction model regarding time-series ON/OFF patterns, the nod timing detector 121 determines whether it is the timing to nod. When it is the timing to nod, the nod timing detect or 121 sends a message indicative of this to the emotion model generator 140 (Step 135). The timing to nod is the timing which is appropriate to respond to words spoken by the companion.

Through the sequence of processing described above, the nod timing detector 121 judges whether it is the timing to nod for every 40 ms, and when judging that it is the nod timing, the nod timing detector 121 sends a message indicating that it is the nod timing to the emotion model generator 140.

Using three thresholds, for every 40 ms, the input voice volume determining unit 122 threshold processes the average value of the AD conversion values obtained at the step 133. As a result, the volume of the input voice is classified into four types of high, middle, low and none. A discriminant signal corresponding to the high level, the middle level or the low level of the input voice is outputted from the input voice volume determining unit 122 and sent to the emotion model generator 140.

From ON/OFF patterns obtained at the step 134, for every 1.6 sec, the input voice existence determining unit 123 calculates the proportion of ON patterns. When the proportion of the ON patterns is larger than a predetermined value (0.5 for instance), the discriminant signal indicative of that there is an input voice is outputted. When the proportion of the ON patterns is equal to or smaller than a predetermined value, the discriminant signal indicative of that there is no input voice is outputted. The discriminant signal is sent to the state managing unit 150.

Based on the input image data from the CCD camera 12f, the face detector 131 extracts a skin color area. Next, based on the size and the shape of the extracted skin area, whether there is a face area in the input image is determined. A message which is indicative of the result is transmitted to the emotion model generator 140 and the state managing unit 150. The face detection by the face detector 131 is performed in a predetermined cycle.

When the face detector 131 detects the face area, the face motion size detecting unit 132 detects the size of a motion of the face area to thereby determine the size of the motion of the face. A message which is indicative of the result is transmitted to the emotion model generator 140. The detection of the size of the motion of the face by the face motion size detecting unit 132 is performed in a predetermined cycle.

The darkness detector 133 detects surrounding darkness based on the input image data from the CCD camera 12f. Detecting that it is dark around, the darkness detector 133 sends a message indicative of this to the state managing unit 150. The darkness detection by the darkness detector 133 is performed in a predetermined cycle.

On the assumption that the robot has three emotions of happy, sad and angry feelings, operations of the emotion model generator 140 will now be described. The emotion model generator 140 has parameters (hereinafter referred to as "emotion parameters") $Level_{Hap}$, $Level_{Sad}$ and $Level_{Ang}$ which express the intensity of happy, sad and angry feelings.

Each emotion parameter repeatedly changes due to a few factors (stimulation provided from outside) which change the emotions. The largest one of the three emotion parameters becomes the current emotion. When the three emotion parameters are the same, it is determined that the robot is happy.

The factors which change the emotions are the nod timing detected by the nod timing detector 121, the volume of the input voice determined by an input voice volume determining unit 122, a face detected by the face detector 131 and the size of the motion of the face detected by the face motion size detecting unit 132. The nod timing serves as an index showing whether the conversation is lively. It is interpreted that more often the nod timing is detected, livelier the conversation is.

When the volume of the input voice is approximately at the middle level and the face of a companion is detected for instance, since the robot is being spoken to merrily and can see the face of the companion, the emotion parameter $Level_{Hap}$ expressing the degree of happiness increases. In this case, the robot becomes happy.

On the other hand, when the volume of the input voice is at the low level and the face of a companion is not detected, since the robot is being spoken to desolately and can not see the face of the companion, the emotion parameter $Level_{Sad}$ expressing the degree of sorrow increases. In this case, the robot becomes sad. Meanwhile, when the volume of the input voice is at the high level, since the robot is being yelled at, the emotion parameter $Level_{Ang}$ expressing the degree of anger increases. In this case, the robot becomes angry.

Figure 9:
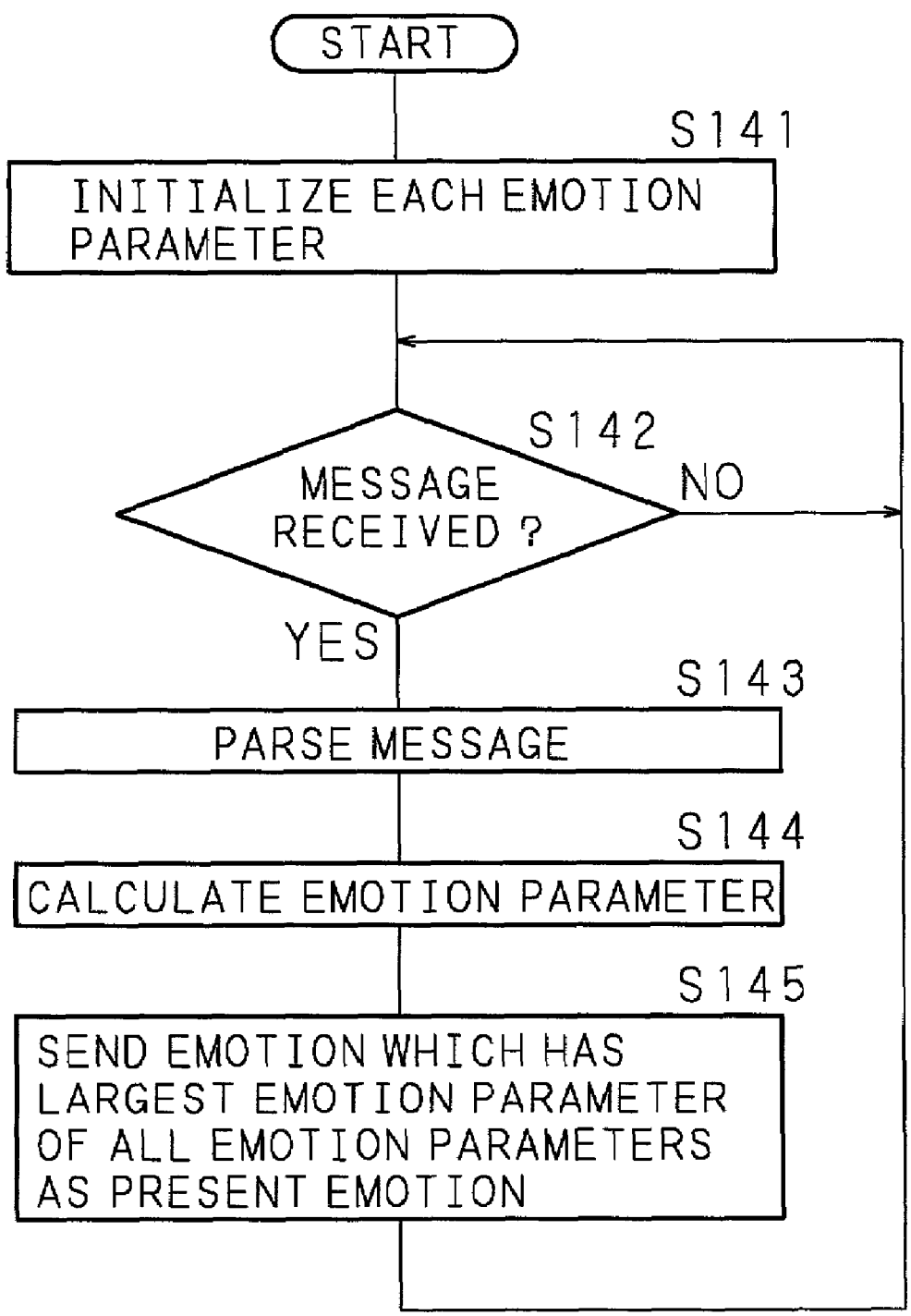
FIG. 9 is a flow chart showing the sequence of processing in an emotion model generator 140.

FIG. 9 is a flow chart showing the sequence of processing in the emotion model generator 140.

Based on the factors which change the emotions, the emotion model generator 140 controls the emotion parameter $Level_{Hap}$ expressing the degree of happiness, the emotion parameter $Level_{Sad}$ expressing the degree of sorrow and the emotion parameter $Level_{Ang}$ expressing the degree of anger.

First, the emotion model generator 140 initializes the respective emotion parameters $Level_{Hap}$, $Level_{Sad}$ and $Level_{Ang}$ (Step 141). The respective emotion parameters $Level_{Hap}$, $Level_{Sad}$ and $Level_{Ang}$ have a value from 0 to 1000. In the initialization at the step 141, the respective emotion parameters $Level_{Hap}$, $Level_{Sad}$ and $Level_{Ang}$ are set to 500 (neutral value).

Next, the emotion model generator 140 waits for receipt of a message from the nod timing detector 121, the input voice volume determining unit 122, the face detector 31 or the face motion size detecting unit 132 (Step 142). Receiving a message transmitted from either of these units, the emotion model generator 140 parses the received signal (Step 143) and calculates the respective emotion parameters (Step 144).

The emotion model generator 140 sends to the reply operation controller 160 the emotion corresponding to the largest emotion parameter among the calculated emotion parameters as the present emotion of the robot (Step 145). When the emotion parameters are all equal, the emotion model generator 140 sends the happy emotion to the reply operation controller 160 as the present emotion of the robot. After this, the emotion model generator 140 returns to the step 142. The respective emotion parameters are calculated based on the formulas below:

$$Point_{Ctl} = Gain_{All} * Point_{Local}$$

$$Level_{Hap}(t) = Gain_{Hap} * Point_{Ctl} + Level_{Hap}(t-1)$$

$$Level_{Sad}(t) = Gain_{Sad} * Point_{Ctl} + Level_{Sad}(t-1)$$

$$Level_{Ang}(t) = Gain_{Ang} * Point_{Ctl} + Level_{Ang}(t-1)$$

In the formula, $Gain_{All}$ is an overall gain which may be 1, for instance. $Point_{Local}$ is a point which is set in advance for each one of the factors which change the emotions. $Gain_{Hap}$, $Gain_{Sad}$ and $Gain_{Ang}$ are gains which are set in advance for the respective factors which change the emotions.

$Point_{Local}$, $Gain_{Hap}$, $Gain_{Sad}$ and $Gain_{Ang}$ are set as shown in Table 1. $Point_{Local}$ is determined experientially from the frequency of occurrence of the factors which change the emotions and the importance levels of the factors which change the emotions. $Gain_{Hap}$, $Gain_{Sad}$ and $Gain_{Ang}$ are positive values with respect to the factors which increase the corresponding emotion parameters but are otherwise negative values.

TABLE 1

| | | $Point_{Local}$ | $Gain_{Hap}$ | $Gain_{Sad}$ | $Gain_{Ang}$ |
|---|---|---|---|---|---|
| NOD TIMING | | 10 | +1 | −1 | −1 |
| VOICE | HIGH | 1 | −1 | −1 | +1 |
| LEVEL | MIDDLE | | +1 | −1 | −1 |
| | LOW | | −1 | +1 | −1 |
| FACE | DETECTED | 5 | +1 | −1 | −1 |
| | NOT DETECTED | | −1 | +1 | −1 |
| FACE | DETECTED | 2 | +1 | −1 | −1 |
| MOTION | NOT DETECTED | | −1 | +1 | −1 |

Where the respective emotion parameters $Level_{Hap}$, $Level_{Sad}$ and $Level_{Ang}$ are set to 500 for instance, when a message indicative of detection of a face is received from the face detector 131, $Point_{Local}=5$, $Gain_{Hap}=+1$, $Gain_{Sad}=-1$ and $Gain_{Ang}=-1$. Hence, $Point_{Ctl}=5$, $Level_{Hap}=505$, $Level_{Sad}=495$ and $Level_{Ang}=495$. As a result, the emotion parameter $Level_{Hap}$ expressing the degree of happiness increases and the emotion parameters $Gain_{Sad}$ and $Gain_{Ang}$ expressing the degree of sorrow and anger decrease.

Based on thinking that each emotion is supposed to tranquilize when there is a continuing state that a message is not received, it is desirable to control each emotion parameter so that each emotion parameter becomes close to the neutral value (500).

Although the factors which change the emotions are the nod timing detected by the nod timing detector 121, the volume of the input voice determined by an input voice volume determining unit 122, a face detected by the face detector 131 and the size of the motion of the face detected by the face motion size detecting unit 132 in the embodiment described above, any combinations of these may be used as the factors which change the emotions.

Operations of the state managing unit 150 will now be described. Considering a message from the input voice existence determining unit 123, a message from the face detector 131 and a message from the darkness detector 133 as events, the state managing unit 150 causes the interaction state to transit in accordance with the state transition table in Table 2, to thereby determine the interaction state of the robot. Thus determined current interaction state of the robot is transmitted to the reply operation controller 160.

TABLE 2

| | INTERACTION STATE | | | |
|---|---|---|---|---|
| EVENT | In Conversation | Conversation Interruption | Autonomic Action | Sleep |
| Input Voice | No Transition | → In Conversation | → In Conversation | → In Conversation |
| No Input Voice | → Conversation Interruption | No Transition | No Transition | No Transition |
| No Speaker | No Transition | → Autonomic Action | No Transition | No Transition |
| Darkness | No Transition | → Sleep | → Sleep | No Transition |

The interaction state of the robot can be four types of "In Conversation," "Conversation Interruption," "Autonomic Action" and "Sleep" in this example.

The events include an event which indicates that there is an input voice which is detected by the input voice existence determining unit 123, an event which indicates that there is no input voice which is detected by the input voice existence determining unit 123, an event which indicates that there is no speaker which is detected by the face detector 131 (i.e., no face detected) and an event which indicates that it is dark which is detected by the darkness detector 133.

For example, when the interaction state is "In Conversation", upon occurrence of an event which indicates that there is no input voice, the interaction state transits to "Conversation Interruption". In this state, as an event which indicates that there is no speaker occurs, the interaction state transits to "Autonomic Action".

When the interaction state is "Conversation Interruption" or "Autonomic Action", upon occurrence of an event which indicates that it is dark, the interaction state transits to "Sleep". In this state, as an event which indicates that there is an input voice occurs, the interaction state transits to "In Conversation".

The events may include at least an event which indicates that there is an input voice which is detected by the input voice existence determining unit 123, an event which indicates that there is no input voice which is detected by the input voice existence determining unit 123, and an event which indicates that there is no speaker which is detected by the face detector 131.

Operations of the reply operation controller 160 will now be described. Based on the reply operation table shown in FIG. 10, the reply operation controller 160 determines an operation which corresponds to a combination of the current emotion of the robot determined by the emotion model generator 140 and the current interaction state determined by the state managing unit 150. The robot acts based on thus determined operation. Although not shown in FIG. 10, in practice, a voice matching with the emotion, i.e., a happy sound voice for a happy feeling, a sad sound voice for a sad feeling or an angry sound voice for an angry feeling, is outputted from the speaker 12*c*.

Although the reply operation controller 160 determines an action of the robot in accordance with a combination of the current emotion of the robot determined by the emotion model generator 140 and the current interaction state determined by the state managing unit 150 in the embodiment described above, the present invention is not limited to this. An action of the robot may be determined considering the character of the robot as well.

When the character of the robot is to be considered, a character setting unit for setting up the personality of the robot is disposed. The companion sets up the character of the robot according to his or her preference. As the types of the character, "timid," "hot-tempered," "gentle," "cheerful," "peaceful" and the like are prepared. For each one of the character types, a reply operation table as that shown in FIG. 10 is generated. An action of the robot is determined using the reply operation table which corresponds to the character type which is set.

When the character type is set to "hot-tempered" and there is a transition to "Autonomic Action" since there is no speaker for instance, the robot acts roughly with surge of an "angry" feeling, e.g., "STRUGGLE"s.

When the character type is set to "peaceful" and there is a transition to "Autonomic Action" since there is no speaker, the robot expresses the angry feeling inside itself by "heaving" etc. with surge of an "angry" feeling.

While the foregoing regarding the respective units has described the operations based on the voice signal inputted through the microphone 12*b*, control using an input signal from a communication signal is also possible according to the present invention.

Figure 11:
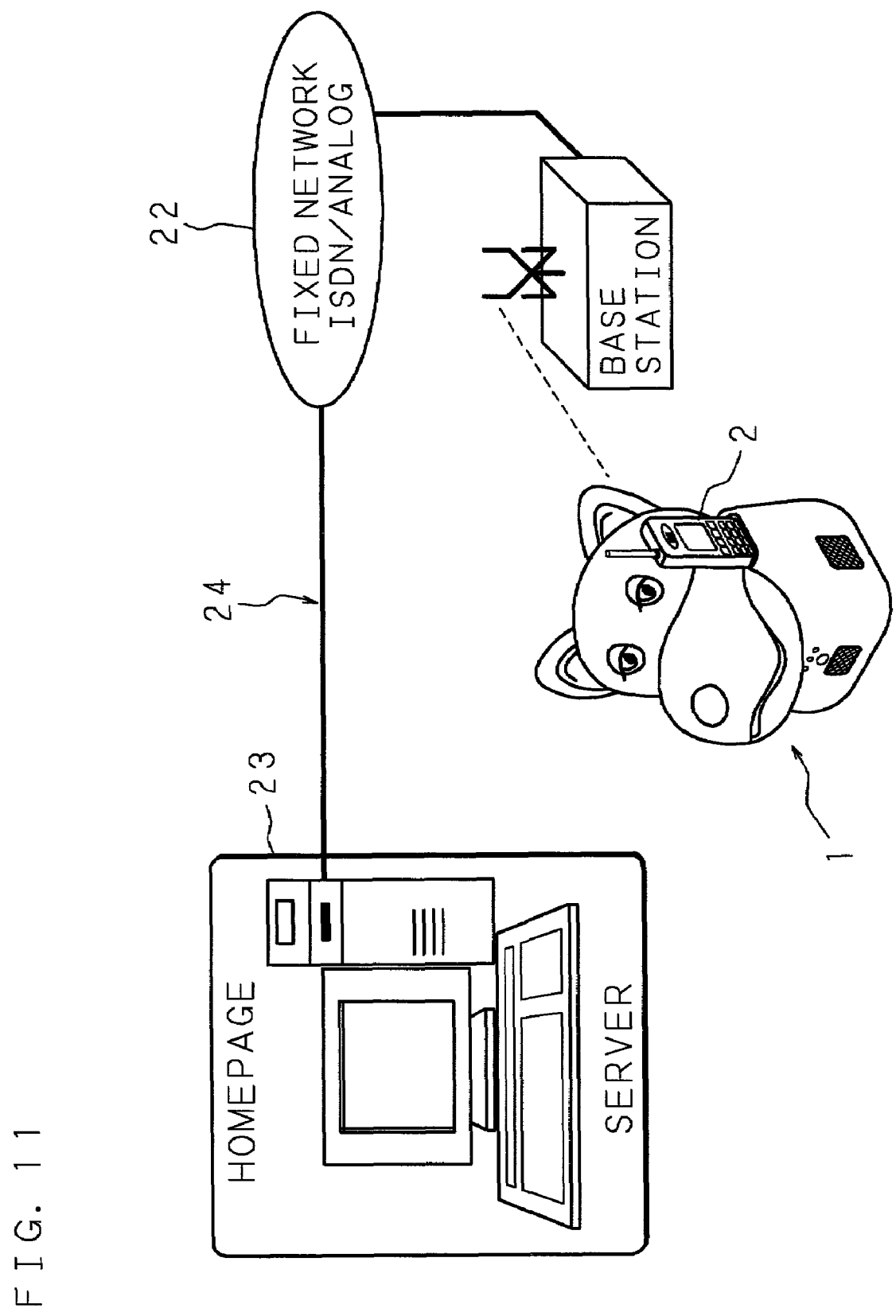
FIG. 11 is a schematic diagram showing an essential structure of an automatic distribution/receipt system for a robot operation program according to the present invention.

An automatic distribution/receipt system will now be described which permits automatic downloading of an operation program registered in an external server apparatus, such as a web page of a company, to the robot. FIG. 11 is a schematic diagram showing an essential structure of an automatic distribution/receipt system for a robot operation program according to the present invention.

In FIG. 11, the automatic distribution/receipt system includes the robot 1, the portable telephone 2 which is connected with the robot 1 in a manner described above, a communication network (Internet line) 24 containing a fixed line network 22 which is connected with the portable telephone 2 via a base station, and an external server apparatus 23 which can link to the communication network 24 and has a database in which various types of service information such as web pages of companies are registered.

Client software called a browser for browsing through web assets is usually installed in the portable telephone 2. The user of the portable telephone 2 accesses the database of the external server apparatus 23, using this browser.

The external server apparatus 23 such as a web page of a company which is a link destination is equipped in advance with a program (Aplet) written in Java for downloading of an operation program. As an access is made from the portable telephone 2 to the enterprise web page through the fixed line network 22 which is a communication network, the program above (Aplet) is executed automatically, whereby an operation program for robots is downloaded to the robot 1 via the portable telephone 2.

Interpreting the downloaded operation program, the robot 1 drives and controls the motors M.

Figure 12:
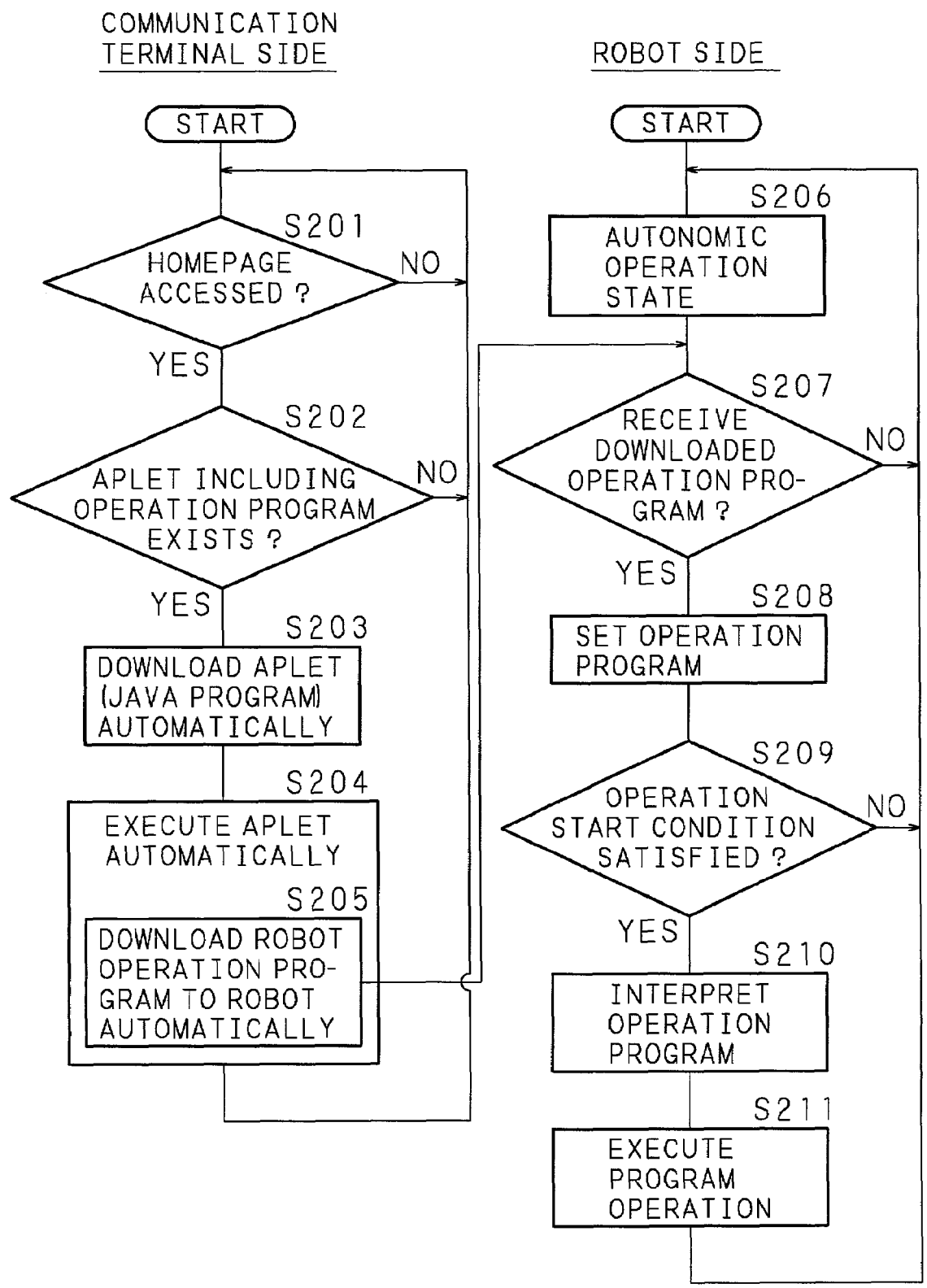
FIG. 12 is a flow chart showing the flow of automatic download of an operation program by a communication terminal and a robot.

The flow of the automatic downloading of the operation program using such a structure above will be described based on the flow chart in FIG. 12.

First, the communication terminal checks whether there is an access from the portable telephone 2 on the Internet line 24 to the external server apparatus 23 such as a homepage of web pages of a company (Step 201). When there is no access, the procedure returns to the start. When there is an access, whether an Aplet which is programmed in Java so as to automatically download a CM-operation program for the robot 1 exists in the company web pages 23 is detected (Step 202). When there is no Aplet, the procedure returns to the start. When there is an Aplet existing, the Aplet (Java/program) is downloaded automatically (Step 203).

Following this, the Aplet is executed automatically and the procedure returns to the start (Step 204). The CM-operation program for the robot 1 thus downloaded to the portable telephone 2 is downloaded automatically to the robot 1 through infrared data communication (IrDA) (Step 205).

Owing to the operation program existing in the robot 1 in advance usually in the autonomic mode, the robot is in an autonomic operation state which allows to freely act (Step 206). Through the automatic downloading by means of the Aplet described above, whether the robot 1 has received the new operation program for robot is checked (Step 207). When the new operation program has not been received, the procedure returns to the start.

When the new operation program has been received, the new CM-operation program received at the portable telephone 2 is set up (stored) on a memory (ROM such as a flash memory) (Step 208). Further, if thus set CM-operation program satisfies an operation condition such as time (Step 209), the content of the CM-operation program is interpreted, converted into information necessary to actually make a move and outputted to the drive circuits (Step 210).

With execution of the CM-operation program, the robot 1 acts in practice (Step 211) and the procedure returns to the start. When the operation condition is not satisfied at the step 209, the procedure returns to the start.

Figure 13:
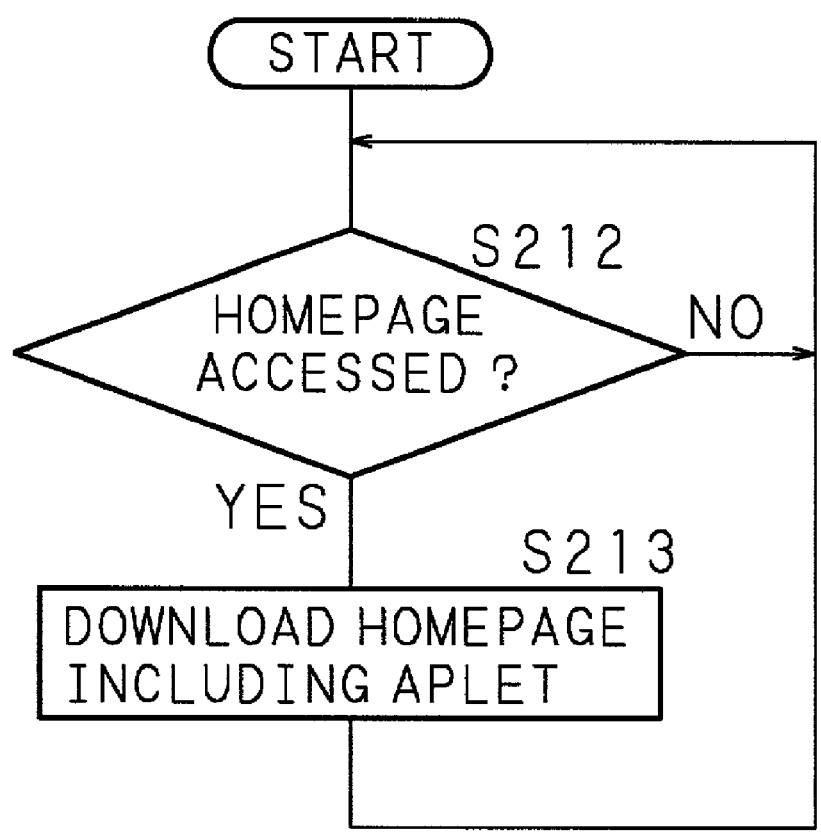
FIG. 13 is a flow chart showing the flow of operations by an external server apparatus.

Processing by the external server apparatus is shown in the flow chart in FIG. 13.

The external server apparatus checks whether there is an access from the portable telephone 2 to a homepage of web pages of a company or the like which is the external server apparatus 23 (Step 212). When there is no access, the procedure returns to the start. When there is an access, web page data containing an Aplet are downloaded (Step 213) and the procedure returns to the start.

In accordance with the flow of the operations described above, the CM-operation program for robots on the external server apparatus 23 such as a web page of a company is automatically downloaded to the robot 1. The downloaded operation program is temporarily stored in a storage part (memory) which is provided in the robot 1, so that it is possible to execute the operation program in accordance with a condition or in real time simultaneously with downloading.

The configuration of the hardware shown in FIG. 3 will now be described with reference to the operation flow chart in FIG. 14.

First, the CPU 16 determines whether it is necessary to change the configuration of the hardware on the memory 31 which is mounted to the main control board 25 (Step 221). When a change is necessary, the most update data are downloaded onto the memory 31 via the CPU 16 and from the communication terminal 27 through various types of the communication interfaces 20 (Step 222). With this data downloaded to the non-volatile memory described above such as a flash memory, unless the hardware needs be changed the next time the power source is turned on, it is possible to configure the FPGA 29 using this data without downloading (corresponding to when there is no change requested at the step 221).

As the downloading completes or preparation to configure the FPGA 29 using the data stored in advance in the non-volatile memory completes at the step 222, configuring is executed starting with the FPGA 29 on the main control board 25 using the dedicated control signal bus 28 (Step 223).

As the configuring completes and the hardware structure is accordingly decided at the step 223, software dependent upon the hardware is initialized in a similar manner to that regarding normal equipment using microcomputers (Step 224). A program of application software corresponding to the hardware is then executed (Step 225).

It is not always necessary that there is one piece of configuration data for FPGAs. A plurality piece of configuration data may be in the non-volatile memory. In addition, data for configuring may be used selectively.

The hardware can be modified at the time of execution of a program of application software. For this purpose, when there is a request for change on the application for instance (Step 226), the procedure returns to the step 222 and different data are downloaded, or alternatively, configuring is performed using different data on the memory 31.

Figure 14:
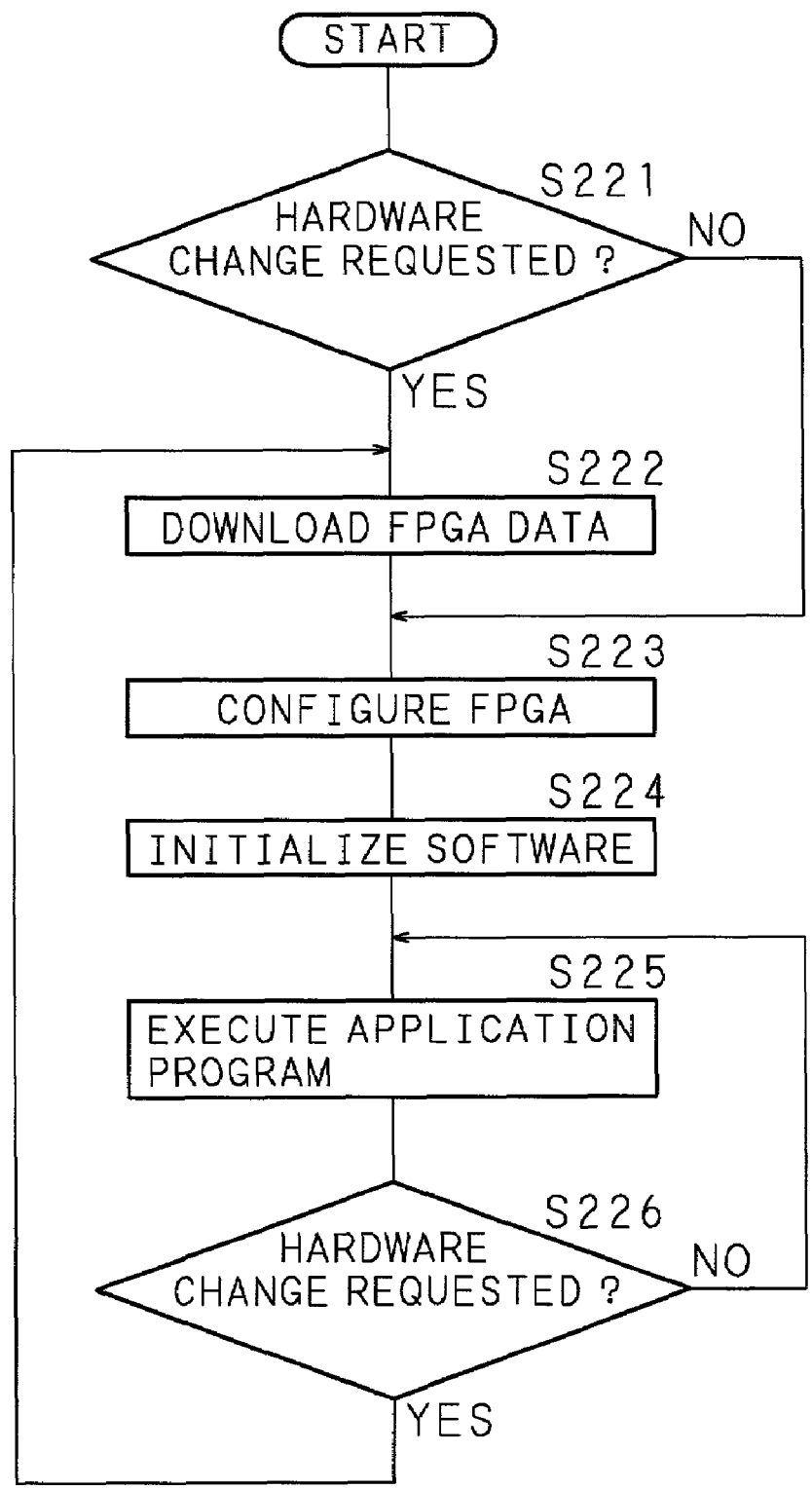
FIG. 14 is an operation flow chart showing a hardware configuration of a control apparatus of a robot which is capable of modifying an operation program.

The operation flow chart which describes configuring of the hardware in FPGAs 26 mounted on the outer connection boards 32 is similar to FIG. 14, and therefore, will not be described.

By means of the structure above, when the portable telephone 2 is handling a call, the robot 1 moves so as to face the user and opens and closes the mouth 11a, nods or otherwise acts in tune with the voice of the person on the phone, thereby behaving as if it were in conversation with the user. When the portable telephone 2 is not handling a call, the robot 1 moves so as to face the user and nods, agrees or otherwise acts in tune with the voice of the user, thereby behaving as if it were in conversation with the user. With an operation program for robots on the external server apparatus 23 such as a web page of a company downloaded, the robot 1 can perform totally new movements.

SECOND EMBODIMENT

Figure 15:
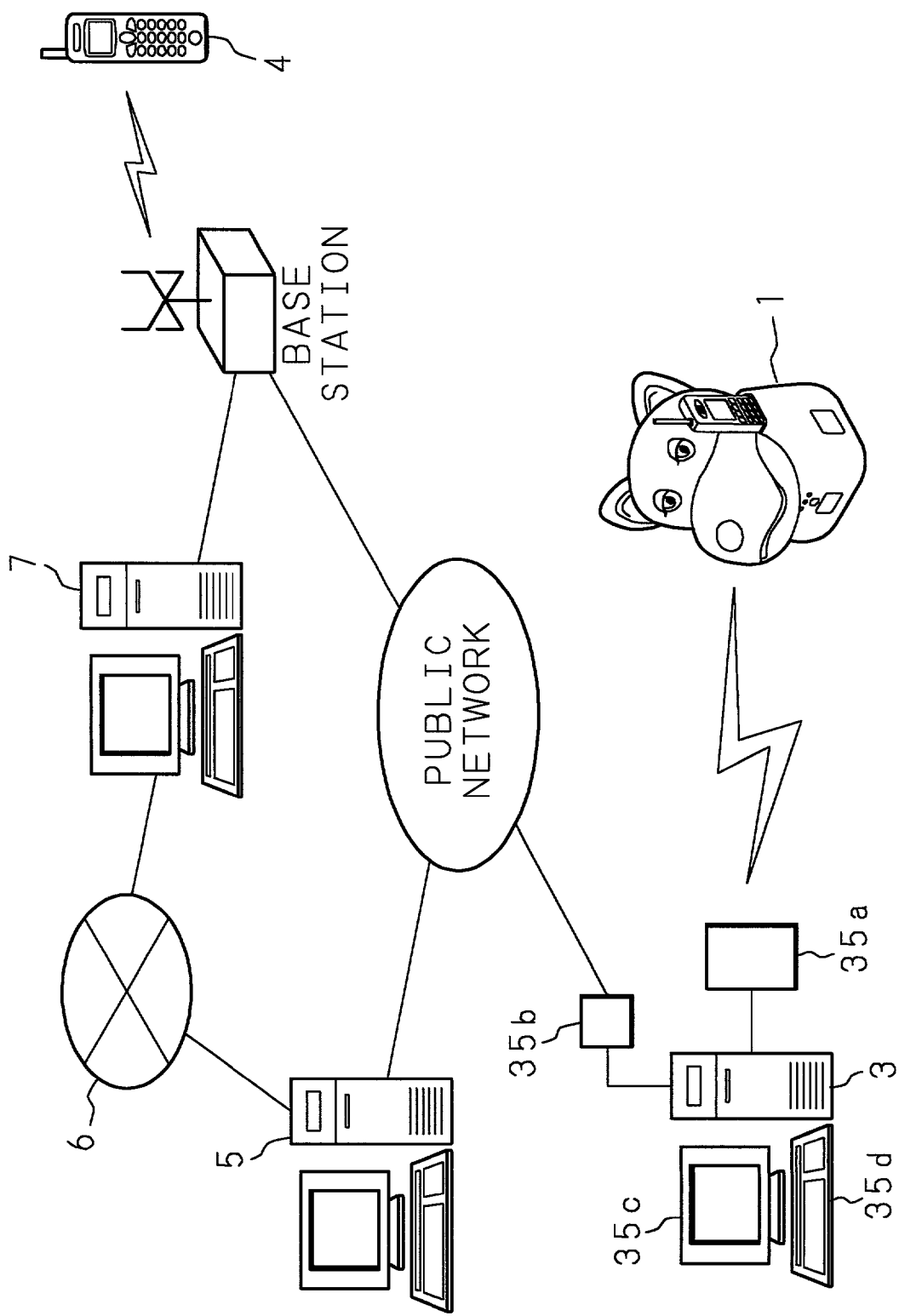
FIG. 15 is a schematic diagram showing an essential structure of a second embodiment of the robot according to the present invention.

FIG. 15 is a schematic diagram showing an essential structure of a second embodiment of a robot according to the present invention. A robot system according to the second embodiment comprises a robot 1, a computer 3 which functions as a communication apparatus and a portable telephone 4. The robot 1 comprises a radio-communication unit 110 which has a communication function such as PHS data communication and Bluetooth.

Figure 16:
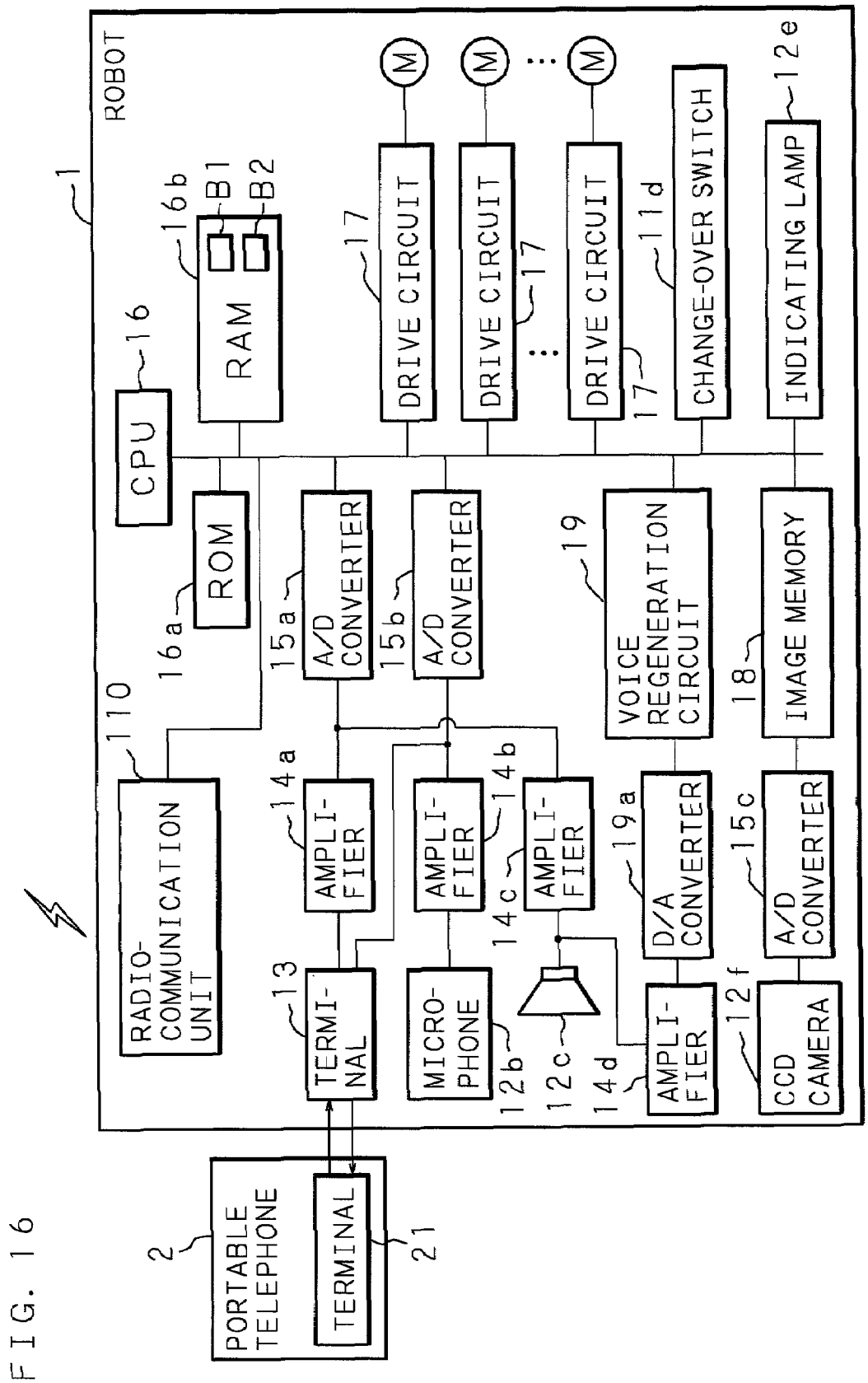
FIG. 16 is a block diagram showing a structure of the robot according to the second embodiment.

FIG. 16 is a block diagram showing a structure of the robot 1 according to the second embodiment. The robot 1 outputs a control signal from a CPU 16 to the drive circuits 17 in response to command data received at the radio-communication unit 110. This enables to remotely operate the robot 1. FIG. 17 shows one example of the command data for the robot 1. The command data are formed by text commands of ASCII codes and parameters which express the amount of motion, a traveling speed, a rotational angle, a rotation angle speed, etc. In the command data "MWSB 20 10" for example, "MWSB" is a text command which expresses an action that the wheels of the robot 1 are driven to retract, "20" is a parameter which expresses the amount of motion, and "10" is a parameter which expresses the traveling speed. Hence, the command data instruct to back off over the distance of 20 at the speed of 10.

In FIG. 17, to WALK is to have the robot 1 act as if it were walking by causing the wheels disposed to leg portions of the robot 1 to rotate and stop repeatedly in predetermined cycles.

As a plurality pieces of command data are linked with ":", and ";" is added after the last piece of command data, an operation program calling for a multiple of actions is created. An operation program "WSB 20 10:WW:D 100:MNR 10 10", for instance, will now be described.

This operation program expresses an action that after the robot retracts over the distance of 20 at the speed of 10, the robot stops for a period of 100 and thereafter tilts the head for the amount of motion of 10 at the speed of 10.

The other structures of the robot 1 according to the second embodiment are similar to those of the robot 1 according to the first embodiment, and therefore, will be denoted at the same reference symbols but will not be described.

Figure 18:
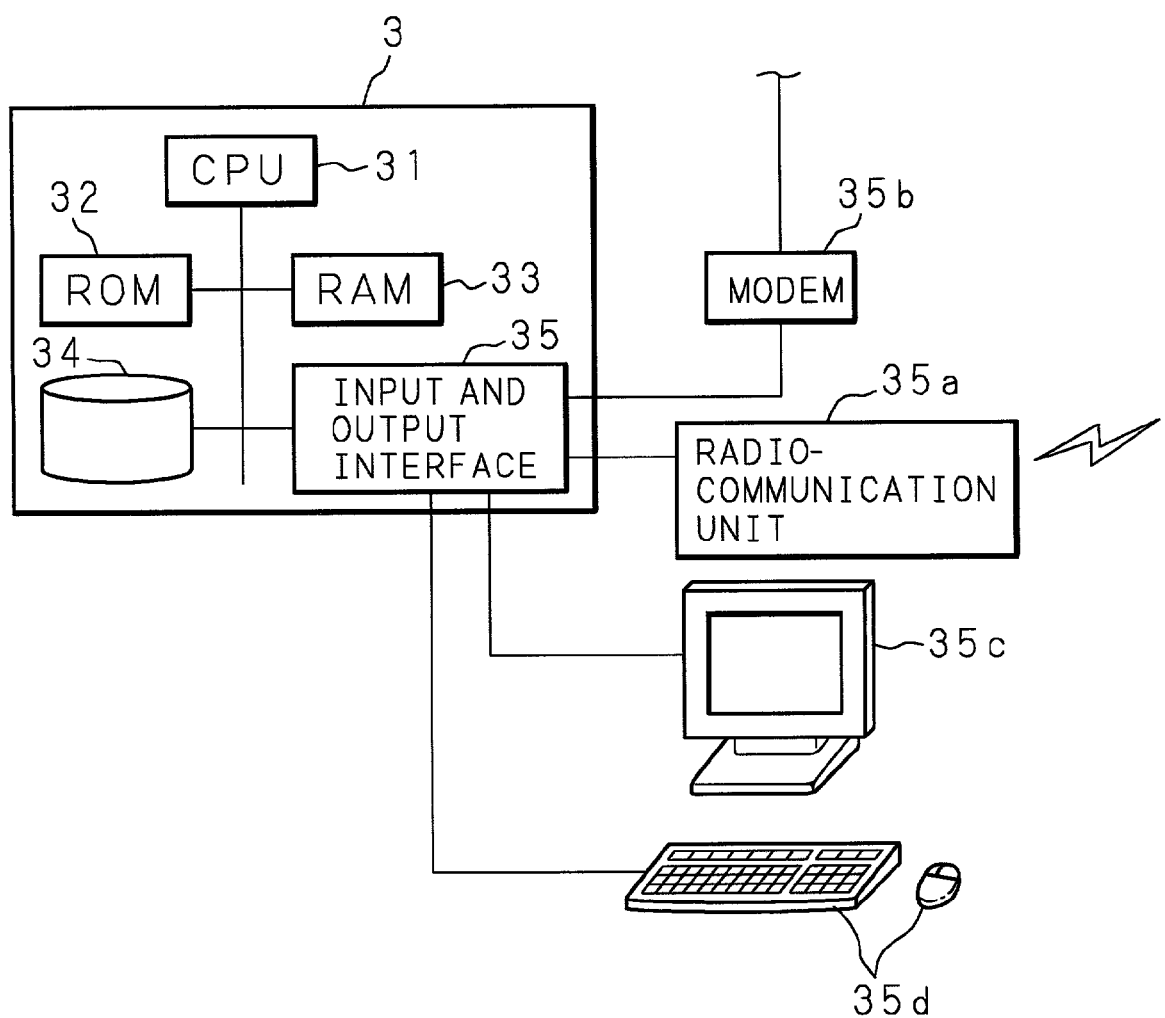
FIG. 18 is a block diagram showing a structure of a computer.
Figure 19:
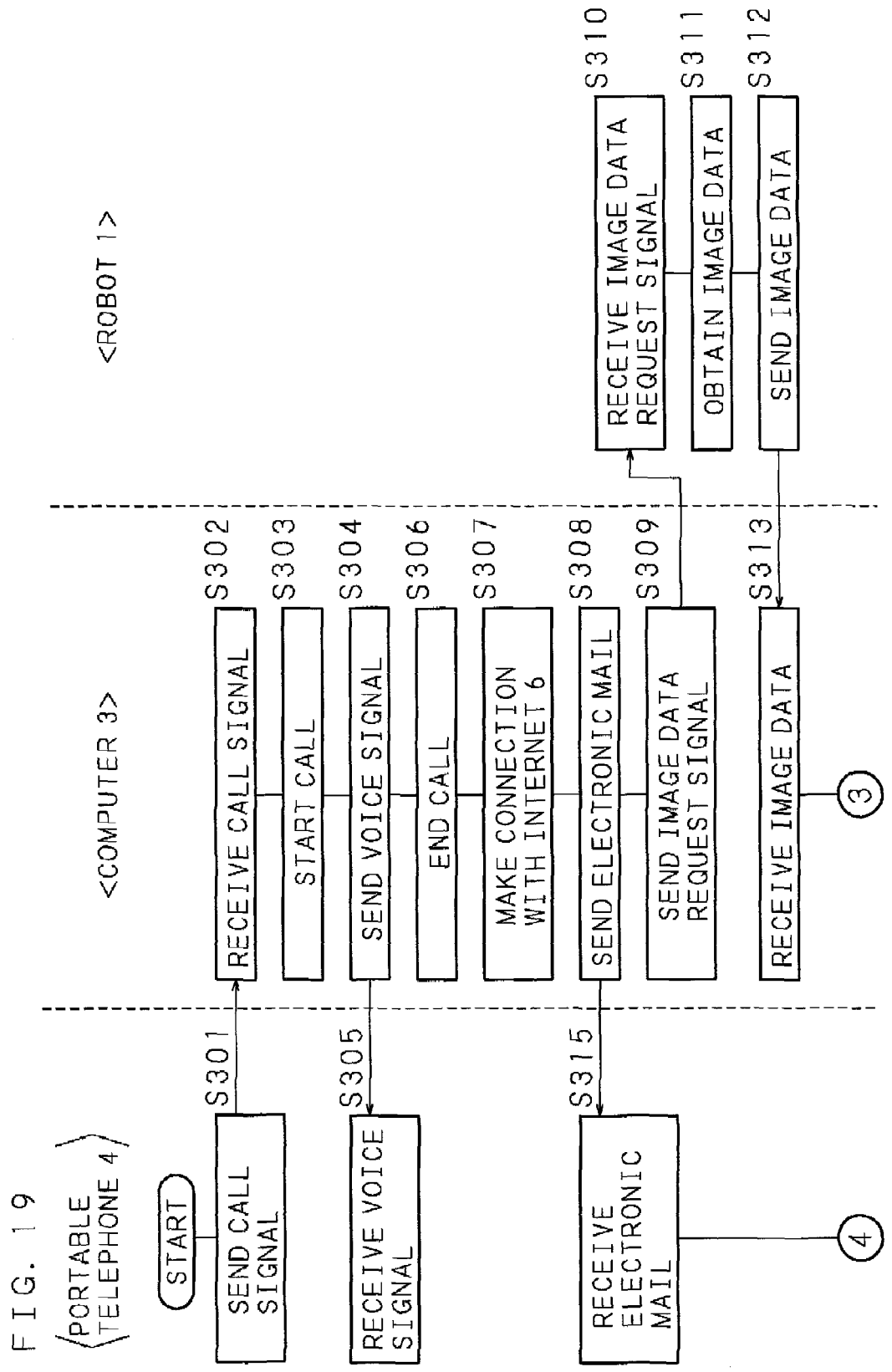
FIGS. 19, 20, 21 and 22 are flow charts showing the flow of actions in a robot system according to the second embodiment.
Figure 20:
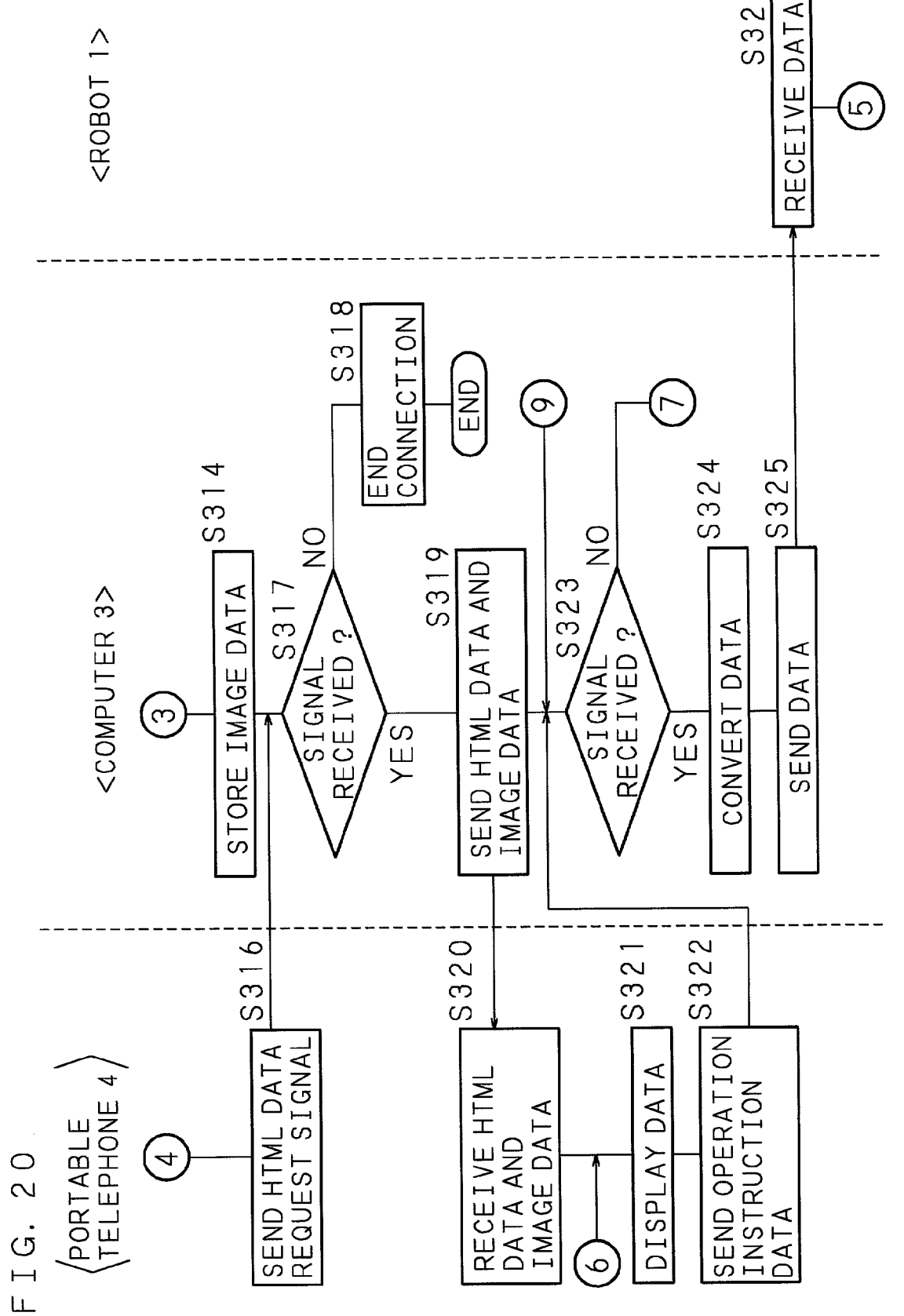
Figure 21:
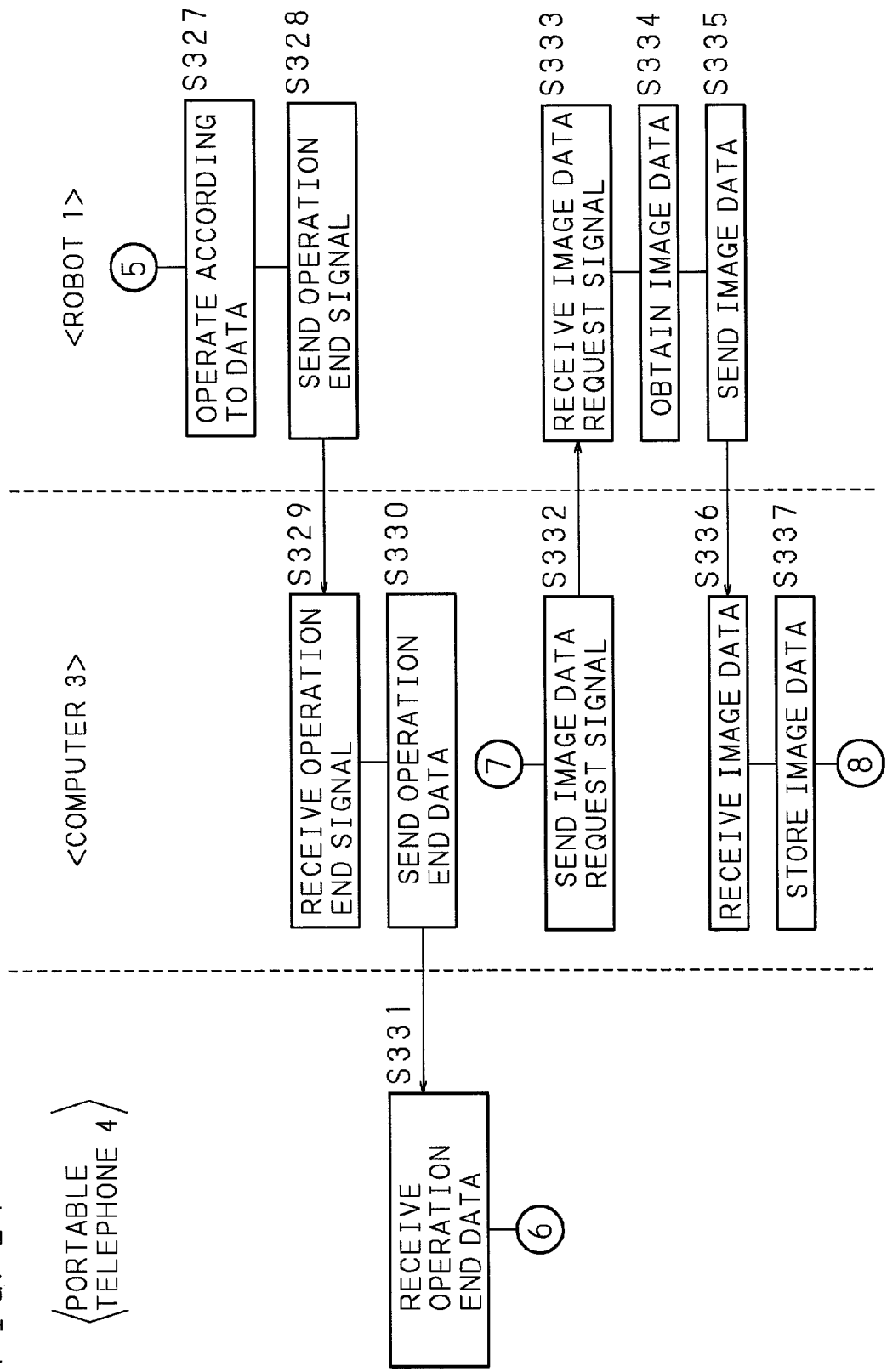
Figure 22:
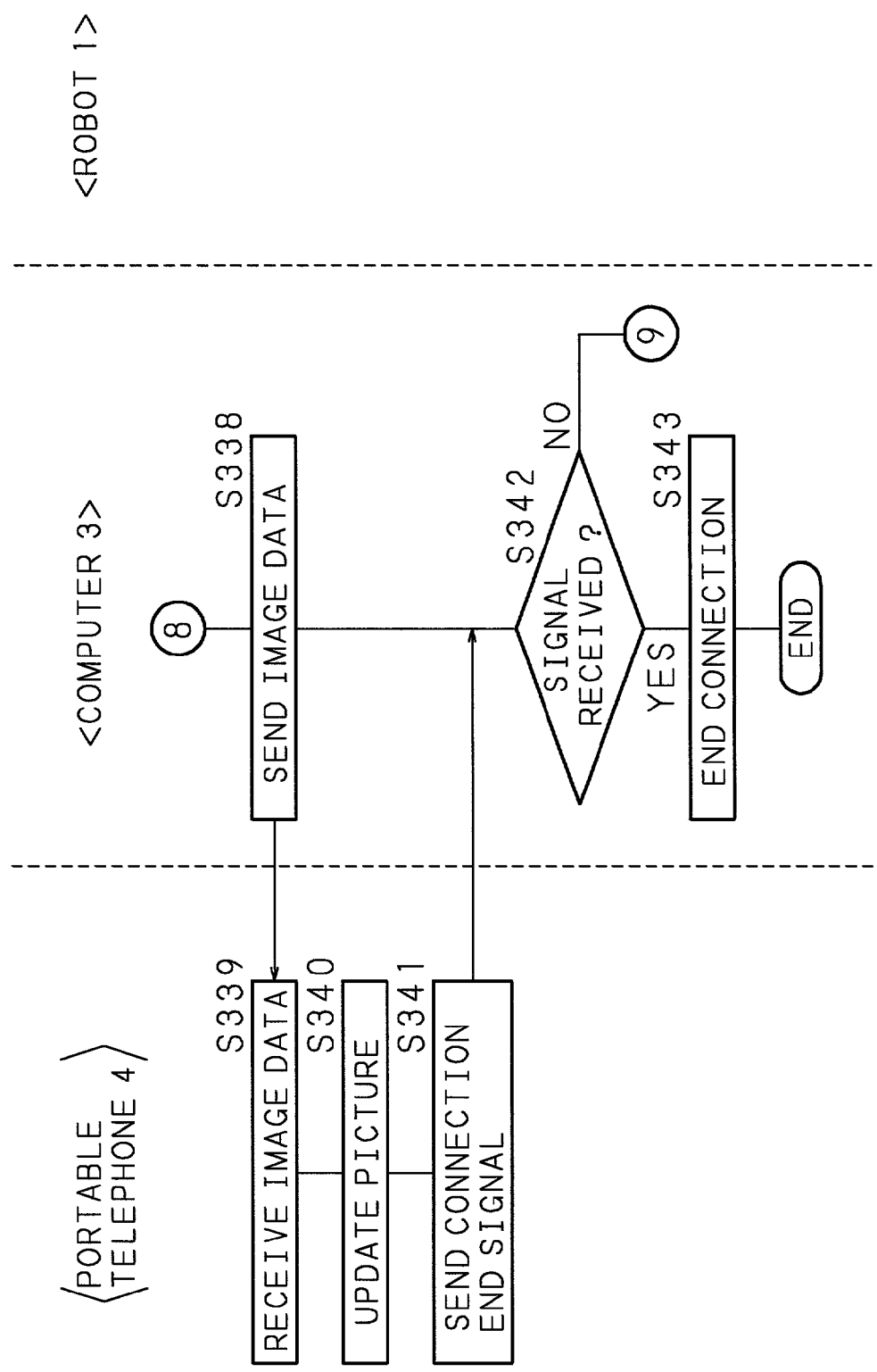

FIG. 18 is a block diagram showing a structure of the computer 3. The computer 3 comprises a CPU 31, a ROM 32 which stores a program to be executed by the CPU 31, data used by this program, etc., a RAM 33 which stores data which are temporarily generated during execution of the program by the CPU 31, a hard disk apparatus 34 which stores a program to be executed by the CPU 31, data used by this program, etc., and an input and output interface 35. Connected with the input and output interface 35 are a radio-communication unit 35a which can communicate with the radio-communication unit 110 of the robot 1, a modem 35b which is connected with a telephone line, a display 35c such as a CRT and an LCD, and an input apparatus 35d such as a key board and a mouse.

Through the modem 35b, the computer 3 can dial-up connect with a computer 5 of an Internet service provider or the like. Hence, the computer 3 can connect with the Internet 6. In the computer 3, a WWW server apparatus program is stored in the hard disk apparatus 34. With the WWW server apparatus program downloaded to the RAM 33, in response to a request from other computer, a portable telephone or the like which is connected on the Internet 6 and in a process of executing the WWW client program, the computer 3 can send HTML data, image data or the like stored in the hard disk apparatus 34 to the computer or the portable telephone.

The portable telephone 4 incorporates a CPU, a ROM, a RAM and the like (not shown). The portable telephone 4 can connect with the Internet 6 via a computer 7 of a telecommunications carrier. A WWW client program is stored in the ROM. As the CPU executes the WWW client program, the portable telephone 4 can request a computer which is connected on the Internet 6 for HTML data, image data or the like, receive the requested HTML data, image data or the like and display a screen image corresponding to the received data on an LCD.

FIGS. 19, 20, 21 and 22 are flow charts showing the flow of operations of the robot system according to the second embodiment. Wishing to monitor the state inside the house, a user manipulates the portable telephone 4 and calls the computer 3. The portable telephone 4, accepting the manipulations given from the user, sends a call signal to the computer 3 (Step 301). The computer 3 receives the call signal from the portable telephone 4 through the modem 35b (Step 302), and starts a call (Step 303). Following this, the computer 3 sends a voice signal representing a voice saying, "Connecting with the Internet. Please wait for transmission of a reply e-mail." to the portable telephone 4 (Step 304). The portable telephone 4 receives the voice signal (Step 305), and outputs a voice from a built-in speaker. The computer 3 then ends the call (Step 306).

Next, the computer 3 sends the computer 5 a connection request signal, and makes a connection with the Internet 6 (Step 307). Staying connected with the Internet 6, the computer 3 sends an e-mail (an electronic mail) formed by text data containing URL which denotes the memory location of the HTML data in the computer 3 to an e-mail address which is associated with the portable telephone 4 (Step 308).

Although the second embodiment requires to send the e-mail when the portable telephone 4 calls up the computer 3, this is not limiting. For instance, the robot 1 may perform image processing on an image captured by the CCD camera 12f to thereby detect abnormality such as intrusion into the house. Upon detection of such abnormality, the robot 1 may request the computer 3 to send the e-mail so that the computer 3, receiving the e-mail, sends the e-mail.

The operations of the robot 1 are usually controlled so as to autonomously act. To be more specific, the robot 1 performs image processing on an image captured by the CCD camera 12f to thereby detect the captured human being or the like. Detecting no human beings or the like within a predetermined period of time, the robot 1 switches to the stand-by state to wait for the receipt of a signal from the computer 3.

The computer 3 sends the robot 1 an image data request signal which represents a request for transmission of image data (Step 309). The robot 1 receives the image data request signal (Step 310), and the CCD camera 12f obtains image data (Step 311). The robot 1 thereafter sends thus obtained image data to the computer 3 (Step 312).

The computer 3 receives the image data (Step 313), converts the image data into image data in a format which can be displayed by the WWW client program of the portable telephone 4 (e.g., JPEG or GIFF) and stores the image data in the hard disk apparatus 34 (Step 314).

The portable telephone 4 receives an e-mail (Step 315). As a user manipulates the portable telephone 4 and selects the URL contained in the e-mail, the portable telephone 4 sends the computer 3 an HTML data request signal which represents a request for transmission of HTML data (Step 316). The computer 3 receives the HTML data request signal (Step 317). When the HTML data request signal is not received within a predetermined period of time, the connection with the computer 5 ends (Step 318) and the procedure ends.

When the HTML data request signal is received within the predetermined period of time, the computer 3 sends to the portable telephone 4 the HTML data stored in the hard disk apparatus 34 and the image data stored at the location within the hard disk apparatus 34 which is expressed by this HTML data (Step 319).

The portable telephone 4 receives the HTML data and the image data (Step 320), and displays a screen image corresponding to the received data on the LCD (Step 321). The screen image shows a plurality of buttons for instructing the robot 1 to act. For instance, as the user manipulates the portable telephone 4, selects one of the buttons and instructs to press this button, operation instruction data which demand the robot 1 to rotate to the right-hand side are transmitted to the computer 3. When the user provides the instruction calling for such an action by the robot 1, the portable telephone 4 sends the operation instruction data which express this instruction regarding action to the computer 3 (Step 322).

The computer 3 receives the operation instruction data from the portable telephone 4 (Step 323), converts the operation instruction data into command data or operation program as that described above (Step 324), and sends this data to the robot 1 (Step 325). Receiving the data (Step 326), the robot 1 is operated in accordance with the received data (Step 327). Upon an end of the operation, the robot 1 sends an operation end signal expressing the end of the operation to the computer 3 (Step 328). The computer 3 receives the operation end signal (Step 329). The computer 3 sends to the portable telephone 4 operation end data indicative of the end of the operation by the robot 1 (Step 330). Receiving the operation end data (Step 331), the portable telephone 4 returns to the step 321 and displays a screen image.

When the computer 3 does not receive the operation instruction data within the predetermined period of time at the step 323, the computer 3 sends the image data request signal to the robot 1 (Step 332). The robot 1 receives the image data request signal (Step 333), obtains image data at the CCD camera 12f (Step 334), and sends thus obtained image data to the computer 3 (Step 335).

Receiving the image data (Step 336), the computer 3 converts the image data into image data in the aforementioned format and stores the image data in the hard disk apparatus 34 (Step 337), and sends the image data to the portable telephone 4 (Step 338). The portable telephone 4 receives the image data (Step 339), and updates the picture on the LCD into a screen image which corresponds to the image data (Step 340).

When wishing to end the connection with the computer 3, the user manipulates the portable telephone 4 and causes the portable telephone 4 to send a connection end signal which expresses an end of connection (Step 341). Upon the receipt of the connection end signal (Step 342), the computer 3 ends the connection (Step 343), and the procedure ends. When the computer 3 does not receive the connection end signal, the computer 3 returns to the step 323.

Although the second embodiment requires to log on the computer 3 to the Internet 6, causes the portable telephone 4 to remotely manipulate the robot 1 through the computer 3 and have the robot 1 send image data or the like to the portable telephone 4, this is not limiting. Alternatively, the robot 1 may incorporate a modem and a WWW server apparatus program may be stored in the ROM 16a of the robot 1 so that when the robot 1 is connected to the Internet 6 via the modem, the portable telephone 4 remotely manipulates the robot 1, or that image data obtained by the CCD camera 12f are stored in the RAM 16b of the robot 1 and downloaded to the portable telephone 4.

By means of the structure described above, when away from home leaving a child, an old person or the like who needs be taken care of at home, the user can learn about the state inside the house by remotely manipulating the robot 1 using the portable telephone 4 from a remote place and confirming on the portable telephone 4 an image captured by the CCD camera 12*f* of the robot 1.

As the robot 1 which is capable of autonomously acting monitors around in the house, the child or old person left at home can develop a friendly feeling toward the robot 1 and therefore feel more secured as compared to where a monitor camera monitors around in the house.

THIRD EMBODIMENT

Figure 23:
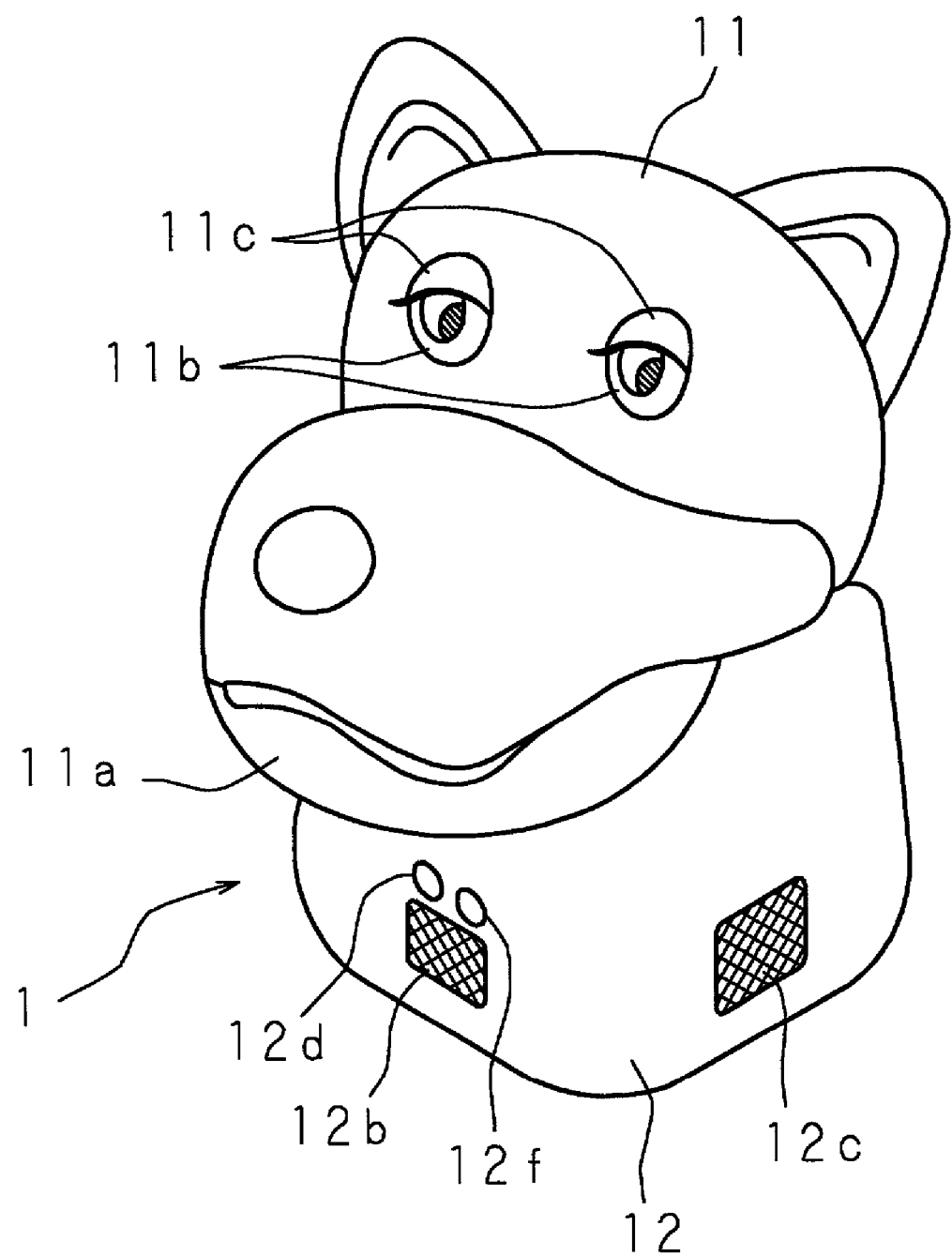
FIG. 23 is a perspective view showing an essential structure of a third embodiment of the robot according to the present invention.
Figure 24:
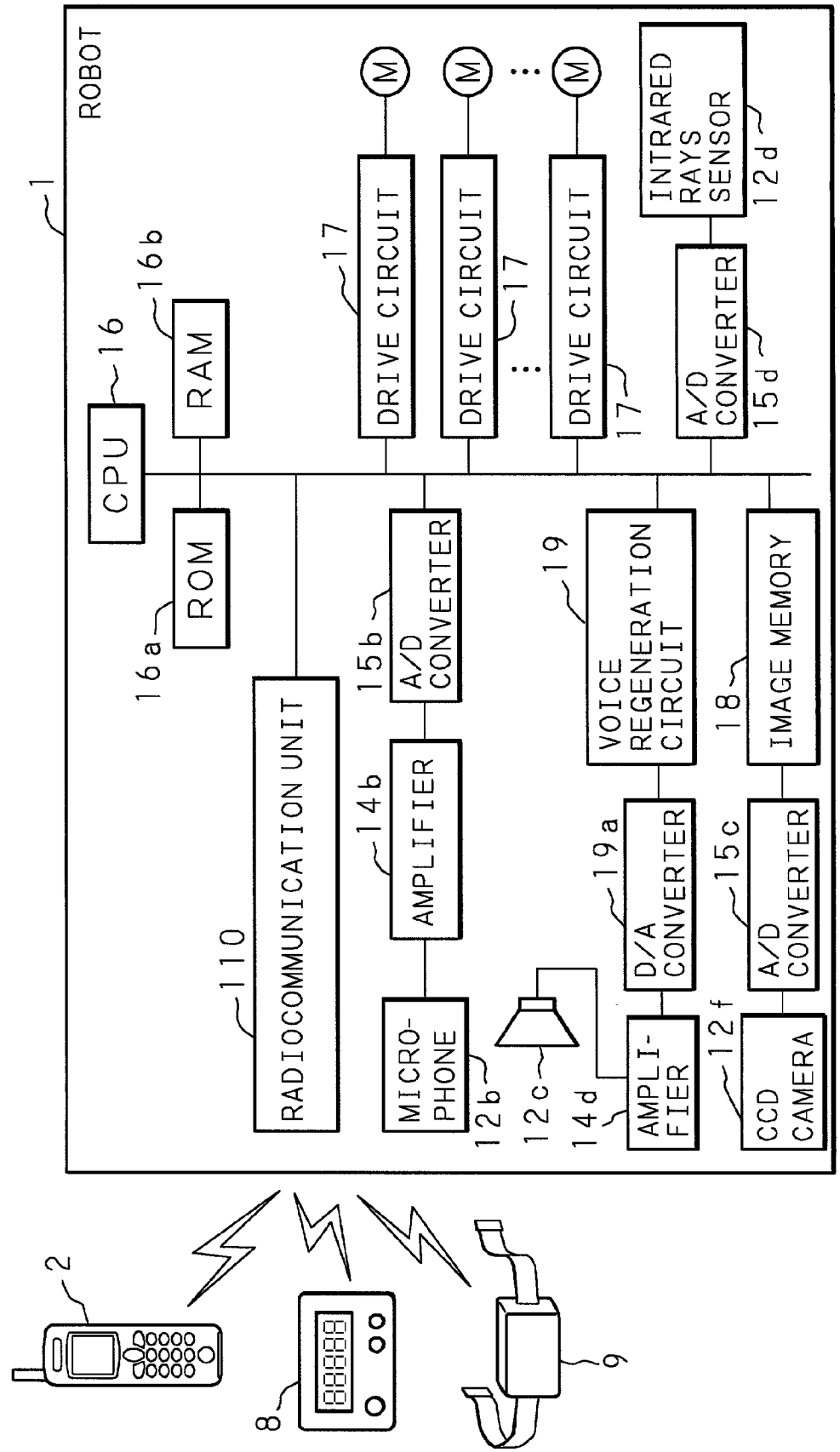
FIG. 24 is a block diagram showing the essential structure of the third embodiment of the robot according to the present invention.

FIGS. 23 and 24 are a perspective view and a block diagram showing an essential structure of the third embodiment of the robot according to the present invention. Portions which are similar to those in the structure of the robot 1 according to the first embodiment will be denoted at the same reference symbols but will not be described.

An infrared rays sensor 12*d* is disposed to the side of the CCD camera 12*f* in a predetermined distance. The infrared rays sensor 12*d* is connected with an A/D converter 15*d*, and the A/D converter 15*d* is connected with the CPU 16. The infrared rays sensor 12*d* outputs an analog signal which corresponds to the quantity of infrared light around the infrared rays sensor 12*d*, and the analog signal is converted by the A/D converter 15*d* into a digital signal and fed to the CPU 16.

In FIG. 24, denoted at 110 is a radio-communication unit which has a communication function such as PHS data communication, Bluetooth or the like. The portable telephone 2 is capable of storing in a built-in RAM (not shown) the voice levels at which the user talked during calls, the history of calls which the user has received and the history of calls which the user has made in one day (everyday life information). Further, a CCD camera (not shown) is incorporated in the portable telephone 2. As the user manipulates the portable telephone 2, the CCD camera captures the face of the user. A CPU (not shown) mounted in the portable telephone 2 processes the captured image, and therefore, it is possible to evaluate the user's complexion among the three levels of good, normal and poor, and store the information regarding the evaluation result (physiological information) in the RAM.

Comprising a radio-communication unit (not shown) which can communicate with the radio-communication unit 110, the portable telephone 2 can send to the robot 1 the information regarding the stored voice levels, the history of received calls, the history of made calls and the user's complexion.

In FIG. 24, denoted at 8 is a steps counter which counts the number of steps the user walked. The steps counter 8 stores information regarding the measured number of steps in one day (everyday life information). Further, the steps counter 8 comprises a radio-communication unit (not shown) which can communicate with the radio-communication unit 110, and therefore, can transmit to the robot 1 the stored information regarding the number of steps.

In FIG. 24, denoted at 9 is a wearable sensor which the user can wear on his or her body. The wearable sensor 9 is capable of measuring the user's heart rate (physiological quantity). As the heart rate is measured, a CPU (not shown) incorporated in the wearable sensor 9 determines whether the heart rate is normal. More specifically, the range of the normal heart rate is defined in advance. When the measured heart rate is within this range, it is judged that the heart rate is normal. When the measured heart rate is not within the range, it is judged that the heart rate is abnormal. The wearable sensor 9 as well comprises a radio-communication unit (not shown) which can communicate with the radio-communication unit 110, and when it is judged that the heart rate is abnormal, data which are indicative of the abnormality in heart rate (physiological information) is transmitted to the robot 1.

The CPU 16 of the robot 1 is capable of detecting that the portable telephone 2 or the steps counter 8 comes into the communication area of the radio-communication unit 110.

Map data depicting inside a building in which the robot 1 is used are stored in the RAM 16*b* of the robot 1 in advance. Disposed to a lower part of the trunk portion 12 is a rotary encoder (not shown) which detects the rotations of the wheels which the robot 1 use to travel. Since the CPU 16 can detect the distance and direction of traveling based on an output from the rotary encoder, the CPU 16 can detect the current location of the robot 1 based on the distance and direction of traveling and the map data.

Figure 25:
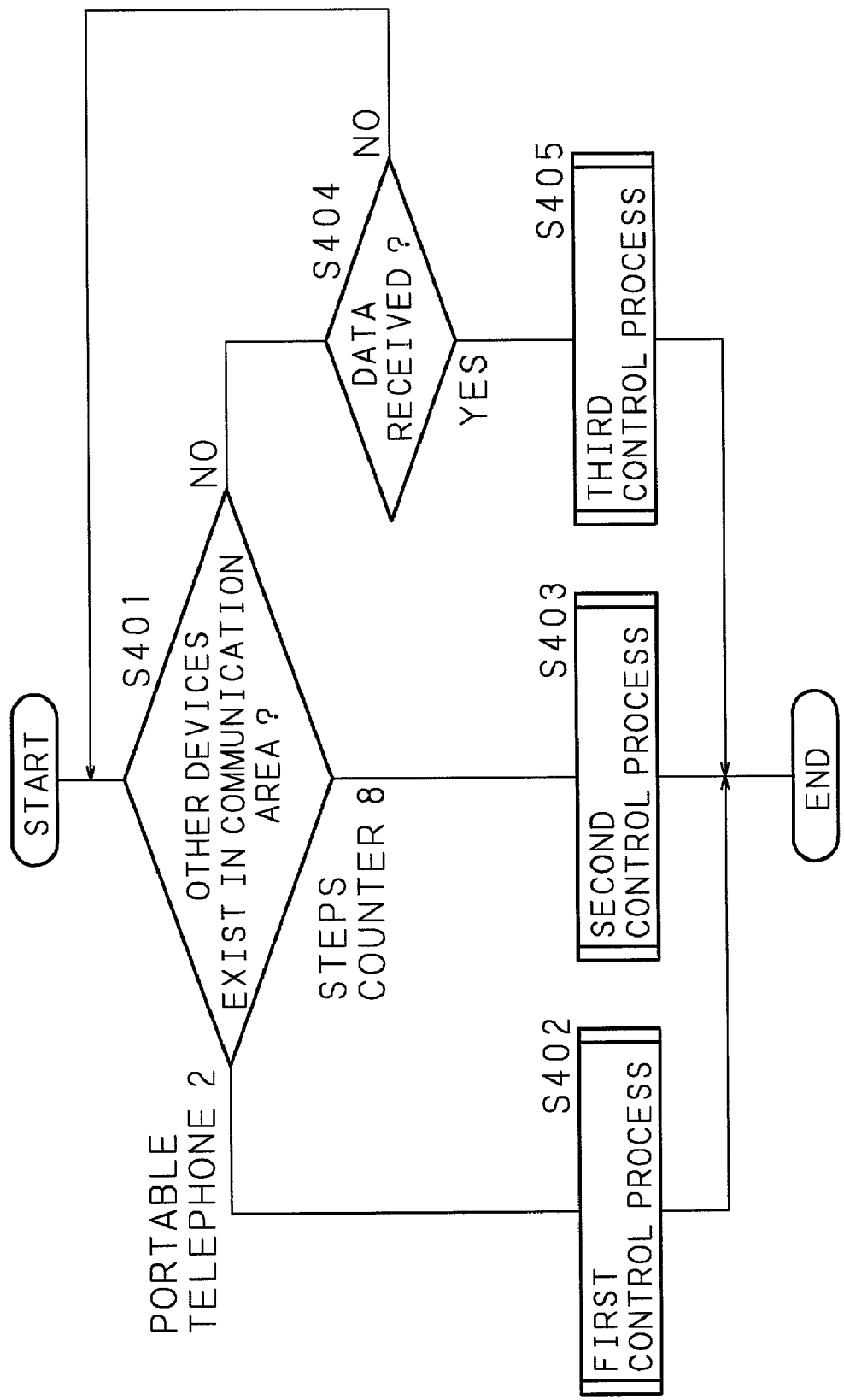
FIG. 25 is a flow chart showing the sequence of processing in a CPU of the third embodiment of the robot according to the present invention.

FIG. 25 is a flow chart showing the sequence of processing in the CPU 16 of the third embodiment of the robot according to the present invention. First, the CPU 16 judges whether the portable telephone 2 or the steps counter 8 exists in the communication area of the radio-communication unit 110 (Step 401). When the portable telephone 2 comes into the communication area, first control processing which will be described later is performed (Step 402). When the steps counter 8 comes into the communication area, second control processing which will be described later is performed (Step 403). When neither the portable telephone 2 nor the steps counter 8 exists in the communication range, the CPU 16 judges whether the data which are indicative of an abnormal heart rate are received by the radio-communication unit 110 from the wearable sensor 9 (Step 404). When there is no receipt of the data, the CPU 16 returns to the step 401. When there is receipt of this data, third control processing which will be described later is performed (Step 405) and the procedure ends.

Figure 26:
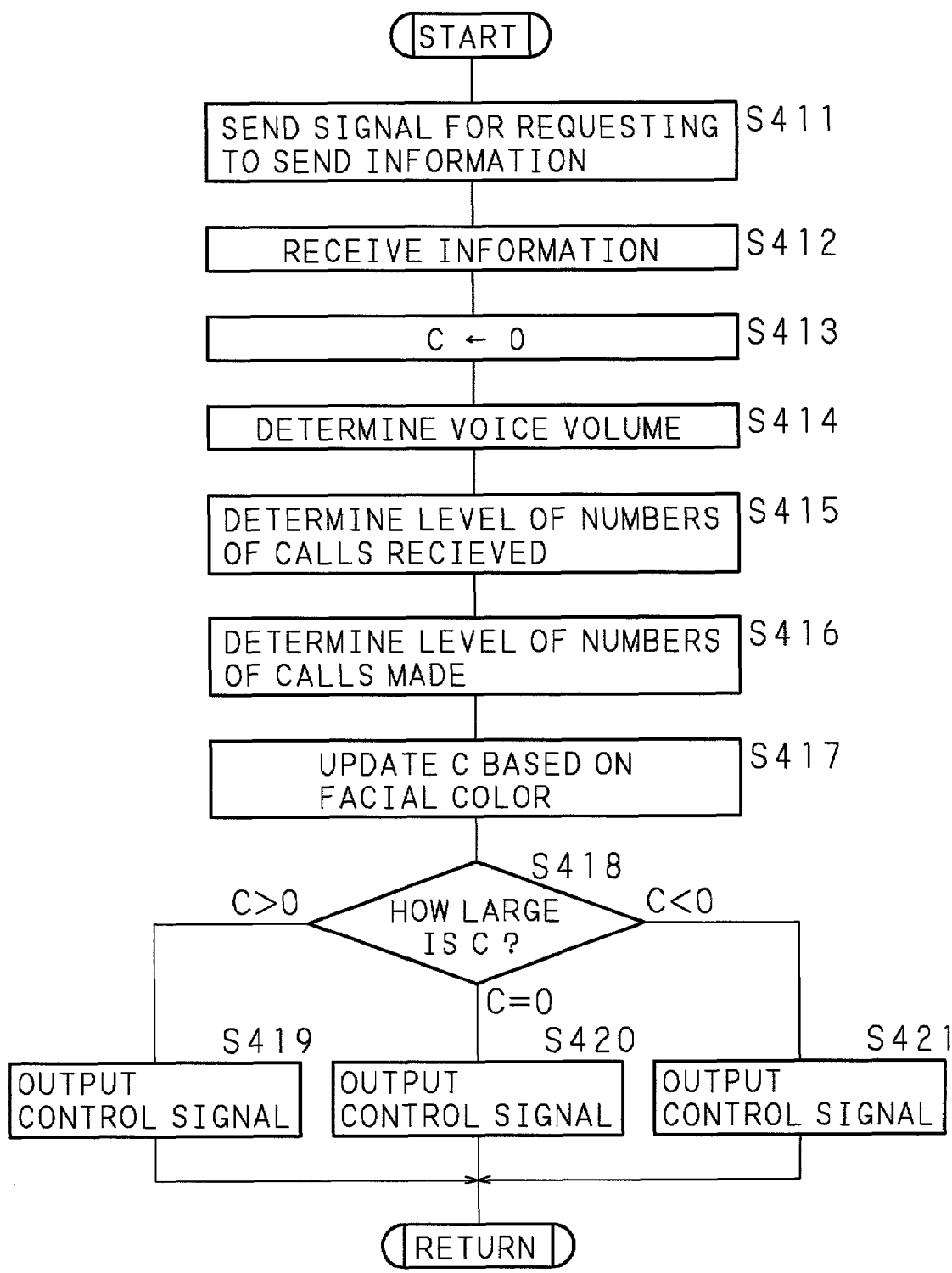
FIG. 26 is a flow chart showing the sequence of first control processing by a CPU.

FIG. 26 is a flow chart showing the sequence of the first control processing by the CPU 16. The CPU 16 causes the radio-communication unit 110 to send a signal requesting to send information to the portable telephone 2 (Step 411). When receiving the signal, the portable telephone 2 sends to the robot 1 the information regarding the voice levels, the history of calls which the user has received, the history of calls which the user has made and the user's complexion. After the radio-communication unit 110 receives the information, the information is received by the CPU 16 (Step 412).

Next, a counter C showing the activity level of the user in one day is set to 0 (Step 413). The CPU 16 then determines the volume of the user's voice during a call, from the voice level contained in the received information. The counter C is updated in accordance with the judgment (Step 414). More specifically, the range of a voice level for a normal volume of voices is defined in advance. When the voice level contained in the received information is within the range, judging that the volume level of the voice is normal, the CPU 16 does not change the counter C. When the voice level contained in the received information is over the range, judging that the voice is loud, the CPU 16 adds 1 to the counter C. When the voice level contained in the received information is below the range, judging that the voice is small, the CPU 16 subtracts 1 from the counter C.

In addition, from the history of calls which the user has received contained in the received information, the CPU 16 determines whether the calls received at the portable telephone 2 in one day are many. The CPU 16 updates the counter C in accordance with the determination (Step 415). More specifically, the range of the number of received calls in a normal condition is defined in advance. The number of the received calls is obtained from the history of the received calls contained in the received information. When the number of the received calls is within the range, judging that the number of the received calls is a normal number, the CPU 16 does not change the counter C. When the number of the received calls is over the range, judging that the number of the received calls is a large number, the CPU 16 adds 1 to the counter C. When the number of the received calls is below the range, judging that the number of the received calls is a small number, the CPU 16 subtracts 1 from the counter C.

In a similar manner, from the history of calls which the user has made contained in the received information, the CPU 16 determines the number of the made calls from the portable telephone 2 in one day. The CPU 16 updates the counter C in accordance with the determination (Step 416). More specifically, the range of the number of made calls in a normal condition is defined in advance. The number of the made calls is obtained from the history of the made calls contained in the received information. When the number of the made calls is within the range, judging that the number of the made calls is a normal number, the CPU 16 does not change the counter C. When the number of the made calls is over the range, judging that the number of the made calls is a large number, the CPU 16 adds 1 to the counter C. When the number of the made calls is below the range, judging that the number of the made calls is a small number, the CPU 16 subtracts 1 from the counter C.

Further, the CPU 16 updates the counter C based on the information regarding the user's complexion, or facial color, contained in the received information (Step 417). More specifically, when the user's complexion information contained in the received information expresses a result evaluating that the complexion is normal, the CPU 16 does not change the counter C. When the user's complexion information expresses a result evaluating that the complexion is good, the CPU 16 adds 1 to the counter C. When the user's complexion information expresses a result evaluating that the complexion is poor, the CPU 16 subtracts 1 from the counter C.

The CPU 16 judges the count of the counter C (Step 418). When C>0, the CPU 16 determines that the user has spent the day actively. In this case, the CPU 16 outputs a control signal to the voice regeneration circuit 19 and the drive circuits 17 so that the robot 1 outputs a voice saying, "You had a good day," and behaves as if it were dancing (Step 419), and returns.

When C=0 at the step 418, the CPU 16 judges that the user has spent the day normally. In this case, the CPU 16 outputs a control signal to the voice regeneration circuit 19 so that the robot 1 outputs a voice saying, "You had an ordinary day. Tomorrow will be a good day," (Step 420), and the CPU returns.

When C<0 at the step 418, the CPU 16 judges that the user has not spent the day actively. In this case, the CPU 16 outputs a control signal to the voice regeneration circuit 19 and the drive circuits 17 so that the robot 1 outputs a voice saying, "Tomorrow will be a good day," and nods (Step 421), and returns.

Figure 27:
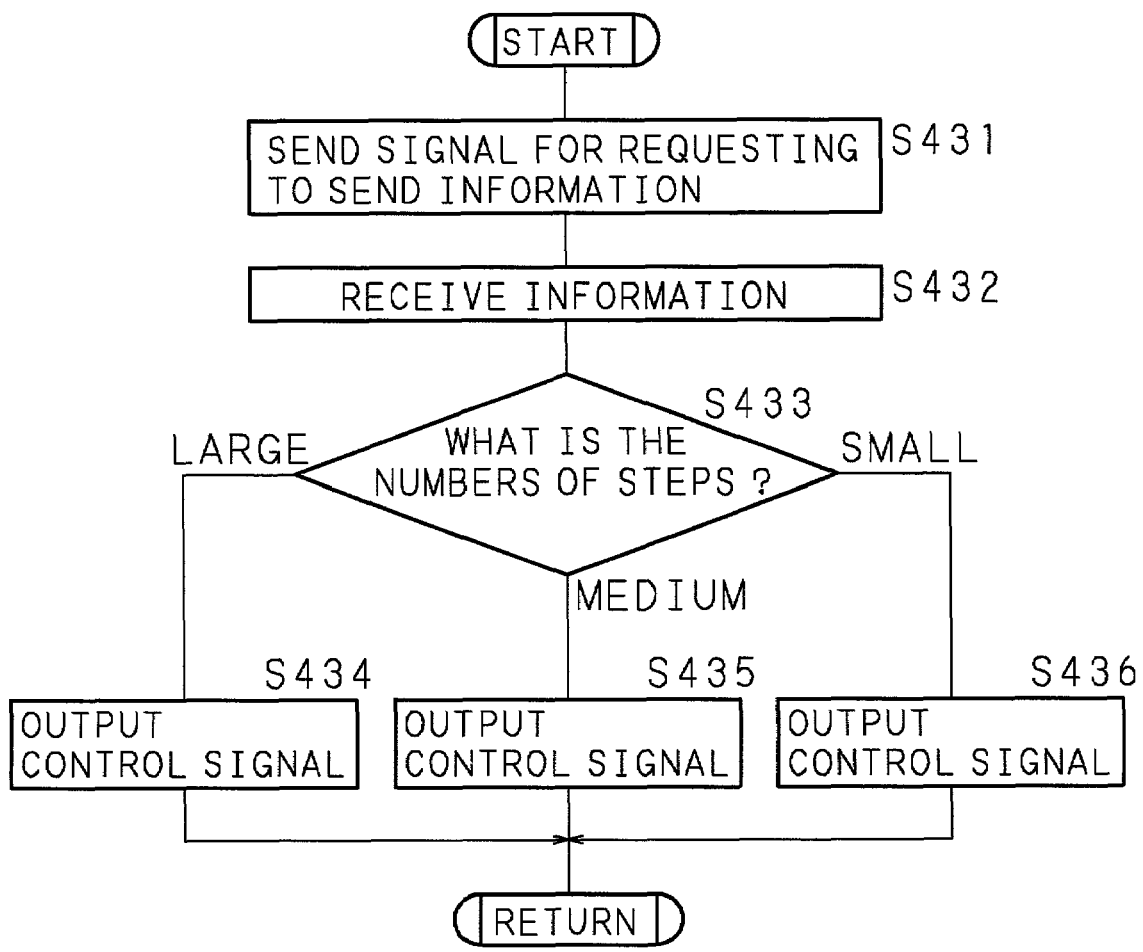
FIG. 27 is a flow chart showing the sequence of second control processing by the CPU.

FIG. 27 is a flow chart showing the sequence of the second control processing by the CPU 16. First, the CPU 16 causes the radio-communication unit 110 to send a signal requesting to send information to the steps counter 8 (Step 431). When receiving the signal, the steps counter 8 sends information representing the number of steps in one day to the robot 1. After the radio-communication unit 110 receives the information, the CPU 16 receives the information (Step 432).

The CPU 16 judges whether the number of steps the user has taken in one day are many (Step 433). More specifically, the range of the number of steps the user normally takes in one day is defined in advance. When the number of the steps contained in the received information is within the range, the CPU 16 judges that the number of the steps is a normal number. When the number of the steps is over the range, the CPU 16 judges that the number of the steps is a large number. When the number of the steps is below the range, the CPU 16 judges that the number of the steps is a small number.

When judging the number of the steps is a large number at the step 433, the CPU 16 outputs a control signal to the voice regeneration circuit 19 and the drive circuits 17 so that the robot 1 outputs a voice saying, "You have walked a lot," and behaves as if it were dancing (Step 434), and returns.

When judging the number of the steps is a normal number at the step 433, the CPU 16 outputs a control signal to the voice regeneration circuit 19 so that the robot 1 outputs a voice saying, "You have walked normally. Try to walk more tomorrow," (Step 435), and returns.

When judging the number of the steps is a small number at the step 433, the CPU 16 outputs a control signal to the voice regeneration circuit 19 and the drive circuits 17 so that the robot 1 outputs a voice saying, "You are not exercising enough. Try to walk more tomorrow," and nods (Step 436), and returns.

Figure 28:
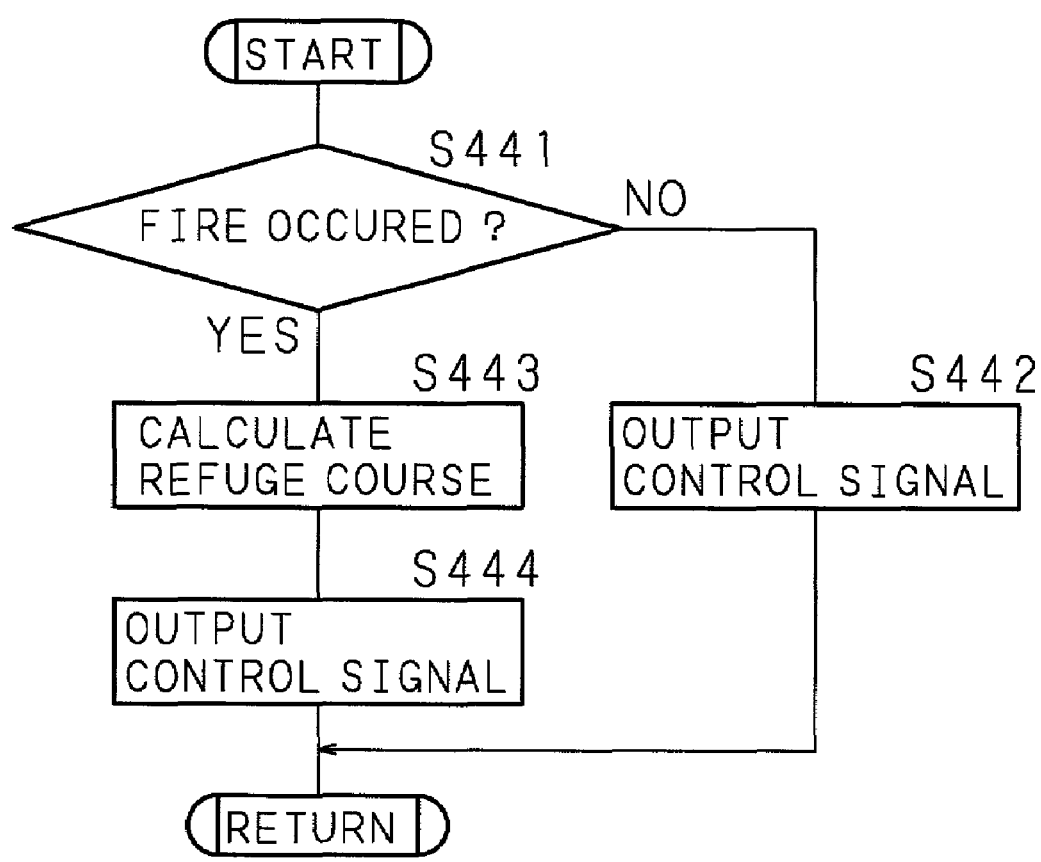
FIG. 28 is a flow chart showing the sequence of third control processing by the CPU.

FIG. 28 is a flow chart showing the sequence of the third control processing by the CPU 16. It is when the radio-communication unit 110 receives data which are indicative of an abnormal heart rate from the wearable sensor 9 that the CPU 16 executes the third control processing. Hence, in this case, it is possible to assume that the user is in an excited state. A cause of the user's mental excitation can be break out of fire, for instance. Noting this, as described below, the third control processing causes the robot 1 to detect break out of fire and accordingly act. First, based on the quantity of infrared light detected by the infrared rays sensor 12*d*, the CPU judges whether there is fire (Step 441). More specifically, the CPU 16 compares the detected quantity of infrared light with a predetermined threshold. When the detected quantity of infrared light exceeds the predetermined threshold, the CPU 16 decides that a fire has occurred. When the detected quantity of infrared light does not exceed the predetermined threshold, the CPU 16 decides that there is no fire. Judging that there is no fire, the CPU 16 outputs a control signal to the voice regeneration circuit 19 so that the robot 1 outputs a voice saying, "Please calm down," (Step 442), and returns.

Upon judgment that there is fire at the step 441, using the current location detected by the CPU 16 and the map data stored in the RAM 16*b*, the CPU 16 calculates the shortest route (refuge course) from the current location to an emergency exit of the building (Step 443). Following this, the CPU 16 outputs a control signal to the voice regeneration circuit 19 and the drive circuits 17 so that the robot 1 repeatedly outputs a voice saying, "I will guide you to the emergency exit," and move along the refuge course (Step 444), and returns.

Although the portable telephone 2 collects information regarding the volume level of the voice at which the user talks during the call using the portable telephone 2, the history of received calls, the history of made calls on the portable telephone 2 (everyday life information) while the steps counter 8 collects information representing the number of steps the user has taken during that day (everyday life information) and the robot 1 is controlled based on these information in the third embodiment, this is not limiting. For example, the portable telephone 2 may collect everyday life information about the user, such as the history of received and made e-mails using the portable telephone 2, which is different from the voice level, the history of received calls, the history of made calls and the number of steps taken, and the robot 1 may be controlled based on this everyday life information.

Although the foregoing has described that the wearable sensor 9 collects information regarding the user's heart rate (physiological information) and the robot 1 is controlled based on the physiological information in the third embodiment, this is not limiting. For instance, the wearable sensor 9 may collect physiological information on the user, such as the user's blood pressure, which is different from the user's heart rate, and the robot 1 may be controlled based on this physiological information.

Although the foregoing has described the third embodiment as the structure that break out of fire is detected through the third control processing and the user is guided to the emergency exit when it is judged that there is fire, this is not limiting. For example, it may be decided that the user's condition has abruptly changed based on that the user's heart rate is abnormal, and this may be reported to people close to the user.

FOURTH EMBODIMENT

Figure 29:
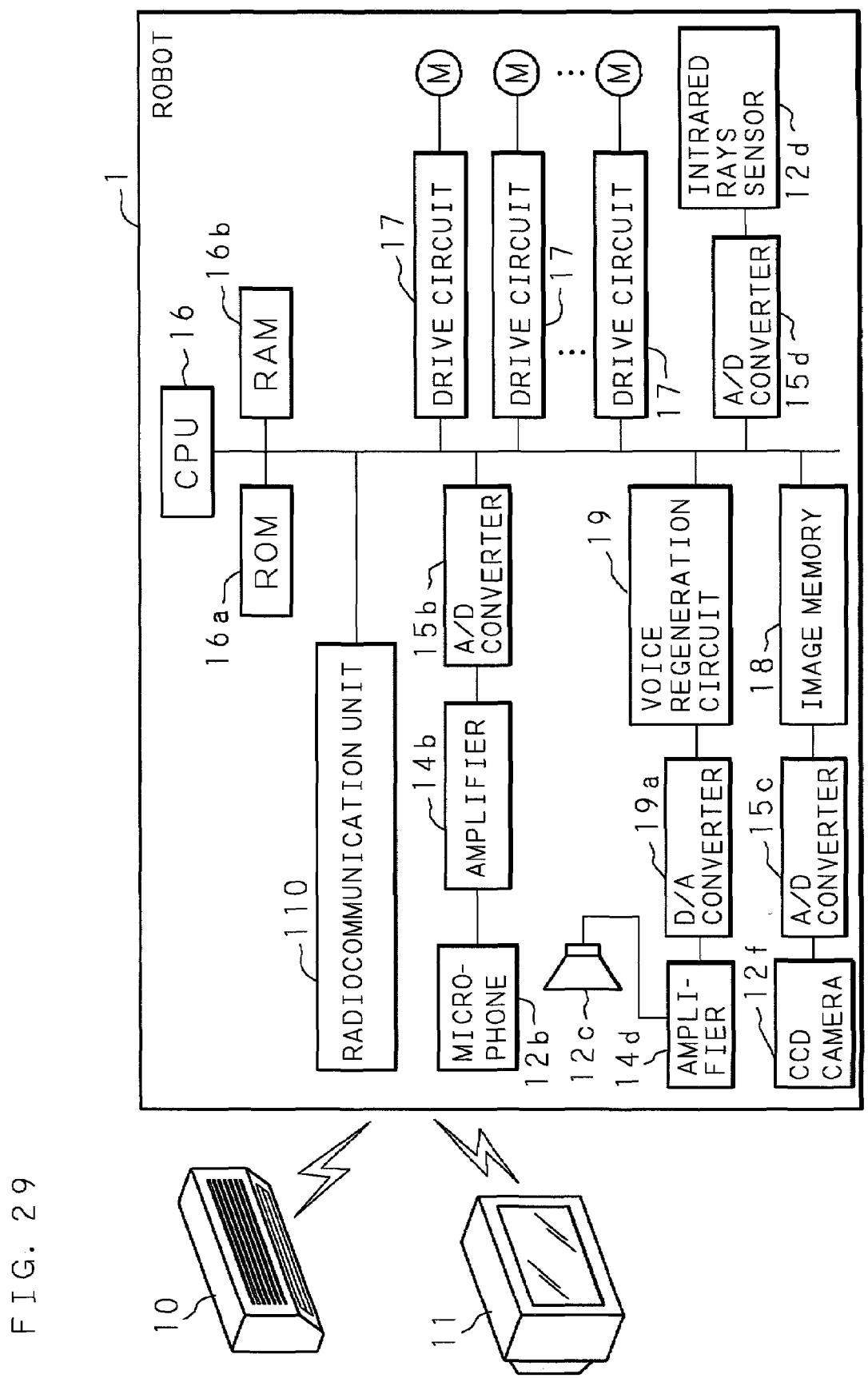
FIG. 29 is a block diagram showing an essential structure of a fourth embodiment of the robot according to the present invention.

FIG. 29 is a block diagram showing an essential structure of a fourth embodiment of the robot according to the present invention. In FIG. 29, denoted at 10 is an air conditioner and denoted at 11 is a television set. Radio-communication units (not shown) having a communication function such as PHS data communication or Bluetooth are incorporated in the air conditioner 10 and the television set 11. Hence, by means of these radio-communication units, the air conditioner 10 and the television set 11 can communicate with the radio-communication unit 110 of the robot 1.

When manipulated by the user, the air conditioner 10 and the television set 11 transmit from their radio-communication units data which correspond to the content of the manipulation such as turning on of the air conditioner and designation of a television channel. Further, upon receipt of data regarding weather forecast provided in data broadcasting through satellite broadcasting for example, the television set 11 can send the data from its radio-communication unit in response to manipulation given by the user.

The air conditioner 10 and the television set 11 have displays which turn on and notify the user of clogging of a filter, a failure or the like upon occurrence of these. When there is clogging of a filter, a failure or the like, the displays turn on and the radio-communication units transmit a signal which notifies of the trouble.

Operation data for manipulating the air conditioner 10 and the television set 11 are stored in the ROM 16a of the robot 1. As the robot 1 sends the operation data from the radio-communication unit 110, the air conditioner 10 and the television set 11 can be remotely operated.

The other structures of the robot 1 according to the fourth embodiment are similar to the structure of the robot 1 according to the third embodiment, and therefore, will be denoted at the same reference symbols but will not be described.

Operations of the robot 1 upon occurrence of clogging of a filter, a failure, etc., with the air conditioner 10 and the television set 11 will now be described. When the filter of the air conditioner 10 gets clogged, or when the air conditioner 10 or the television set 11 breaks down, a signal notifying the state of the apparatus is transmitted from the air conditioner 10 or the television set 11. The radio-communication unit 110 receives the transmitted signal which will be then supplied to the CPU 16. The CPU 16 outputs a control signal corresponding to the signal to the voice regeneration circuit 19 so that a voice corresponding to the signal comes out from the speaker 12c. After a voice signal corresponding to the control signal is outputted from the voice regeneration circuit 19, a voice is emitted from the speaker 12c.

When the user is far away, the robot 1 moves close to the user and notifies the user of clogging of filter of the air conditioner 10 or the failure of the air conditioner 10 or the television set 11.

Operations of the robot 1 for remotely manipulating the air conditioner 10 or the television set 11 will now be described. Manipulated by the user, the air conditioner 10 or the television set 11 sends data expressing the content of the manipulation given, from the radio-communication unit. The transmitted data are received by the radio-communication unit 110 of the robot 1 and then fed to the CPU 16.

The CPU 16 stores such data in the RAM 16b and executes the following processing, to thereby remotely operate the air conditioner 10 and the television set 11. Based on the data, the CPU 16 judges whether the same manipulation was given within 30 min. around the predetermined time everyday over five days, e.g., whether the air conditioner 10 was started to operate between 06:45 and 07:15 everyday over five days.

For instance, if the air conditioner 10 was started to operate between 06:45 and 07:15 everyday over five days, the CPU 16 decides that the air conditioner 10 was started to operate at 7 o'clock everyday over the five days and waits until 7 o'clock. At 7 o'clock, the CPU 16 sends to the air conditioner 10 from the radio-communication unit 110 operation data which instruct to start cooling the air, whereby the air conditioner 10 is remotely manipulated.

Figure 30:
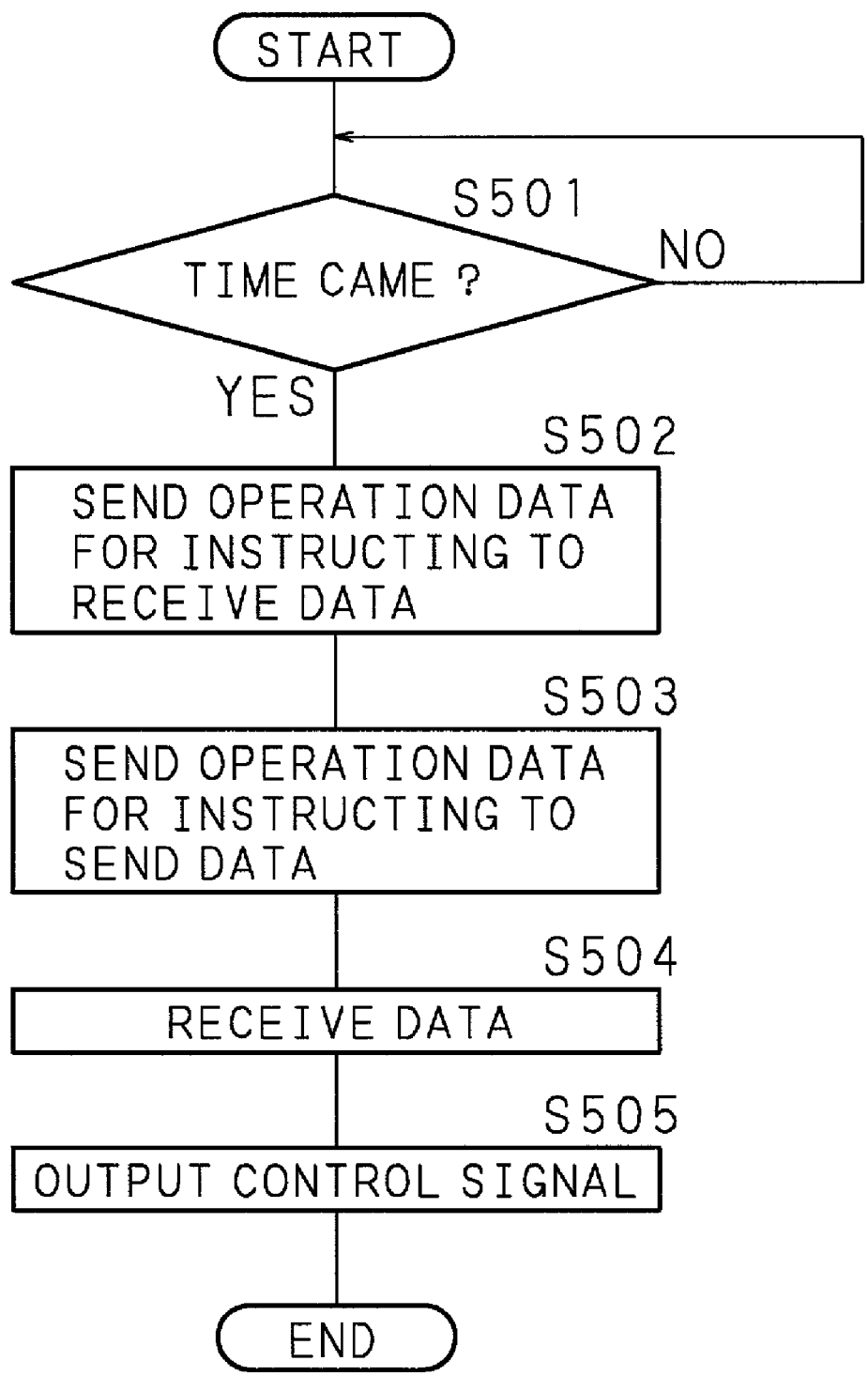
FIG. 30 is a flow chart showing one example of the sequence of processing in a CPU in which a robot remotely manipulates a television set.

FIG. 30 is a flow chart showing one example of the sequence of processing in the CPU 16 for having the robot remotely manipulate the television set 11. When deciding through the processing described above that data from the same data broadcasting was received at the same time of a day everyday over five days, the CPU 16 judges whether that time has come (Step 501). When it is not that time yet, the CPU 16 repeats the step 501. When it is that time, the CPU 16 sends to the television set 11 from the radio-communication unit 110 operation data which instruct to receive data from the data broadcasting (Step 502), and further sends to the television set 11 from the radio-communication unit 110 operation data which instruct to send the received data (Step 503).

The television set 11 at the radio-communication unit thereof receives these operation data and operates in accordance with the operation data. From the radio-communication unit of the television set 11, the data from the data broadcasting are transmitted. This data are received by the radio-communication unit 110 and fed to the CPU 16. The CPU 16 accepts the data (Step 504), and outputs a control signal in accordance with the data to the voice regeneration circuit 19 so that a voice telling the content expressed by the data comes out from the speaker 12c (Step 505). The procedure then ends.

In this structure, if the television set 11 receives data regarding weather forecast at 7 o'clock everyday for example, the robot 1 outputs a voice notifying the content of the weather forecast at 7 o'clock.

Although the foregoing has described the fourth embodiment as the structure that the robot 1 notifies the user of occurrence of clogging of a filter, a failure or the like in the air conditioner 10 and the television set 11 and remotely operates the air conditioner 10 and the television set 11, this is not limiting. For instance, the robot 1 may notify the user of occurrence of malfunction in a different apparatus such as a refrigerator which is different from the air conditioner 10 and the television set 11. Further alternatively, the robot 1 may remotely operate a different apparatus such as an air purification system which is different from the air conditioner 10 and the television set 11.

While the foregoing has described that if the television set 11 received data from a particular sender approximately at the same time of a day over more than one day, the television set 11 receives data from the sender at the time corresponding to the time of a day mentioned above after these past couple of days and the robot 1 outputs a voice corresponding to the data in the fourth embodiment, this is not limiting. If a different apparatus such as a radio set which is different from the television set 11 receives data from a particular sender approximately at the same time of a day over more than one day, the apparatus may receive data from the sender and the robot 1 may output a voice corresponding to the data.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A robot system comprising:
   a communication apparatus of one of a portable telephone and a radio communication unit for communicating with an outside communication device to receive a voice signal and output one of a voice and a voice signal which corresponds to the received voice signal; and
   a robot;
   the robot having:
   a movable unit;
   an imaging unit; and
   a control unit which drives said movable unit based on an evaluation value obtained by calculating the one of the voice and the voice signal outputted from said communication apparatus and an image captured by said imaging unit.

2. The robot system according to claim 1 wherein a portion of the robot has features that correspond to those of a human and said control unit drives said movable unit to operate the robot to perform at least one of the acts of blinking, opening/closing the mouth and nodding.

3. A robot system comprising:
   a communication apparatus of one of a portable telephone and a radio communication unit for communicating with an outside communication device to receive a voice signal and output one of a voice and a voice signal which corresponds to the received voice signal; and
   a robot;
   the robot having:
   a movable unit;
   a voice input unit;
   a voice output unit;
   a control unit which drives said movable unit based on an evaluation value obtained by calculating the one of the voice and the voice signal outputted from said communication apparatus; and
   a voice determining unit which determines a voice to be outputted based on the voice which is inputted at said voice input unit,
   wherein said voice output unit outputs the voice which is determined by said voice determining unit.

4. The robot system according to claim 7, wherein said robot further comprises an imaging unit, and said control unit drives said movable unit based on an image captured by said imaging unit.

5. The robot system which operates a robot based on emotions thereof according to claim 2, further comprising:
   an emotion determining unit which determines the emotion of the robot based on external stimulation;
   a state determining unit which determines the current interaction state of said robot based on external stimulation; and
   a reply operation control unit which causes said robot to realize an emotion for the present which is determined by said emotion determining unit and an interactional action for the present which is determined by said state determining unit.

6. The robot system according to claim 3 wherein a portion of the robot has features that correspond to those of a human and said control unit drives said movable unit to operate the robot to perform at least one of the acts of blinking, opening/closing the mouth and nodding.

7. A robot system comprising a communication apparatus and a robot,
   the communication apparatus having:
   a first receiving unit which receives from outside first action instructing information which expresses an instruction regarding an action of said movable unit;
   a first transmission unit which transmits to said robot second action instructing information which corresponds to said first action instructing information which is received by said first receiving unit;
   a second receiving unit which receives first image information which expresses an image which is transmitted from said robot; and
   a second transmission unit which transmits to outside second image information which corresponds to said first image information which is received by said second receiving unit,
   the robot having:
   a movable unit;
   an imaging unit;
   a third receiving unit which receives said second action instructing information which is transmitted from said communication apparatus;
   a control unit which drives said movable unit based on said second action instructing information which is received by said third receiving unit; and
   a third transmission unit which transmits said first image information to said communication apparatus based on an image captured by said imaging unit.

8. A robot system comprising:
a communication apparatus which receives a voice signal and outputs one of a voice and a voice signal which corresponds to the received voice signal; and
a robot;
the robot having:
a movable unit;
an imaging unit; and
a control unit which drives said movable unit based on the one of the voice and the voice signal outputted from said communication apparatus and an image captured by said imaging unit;
wherein said communication apparatus further comprises:
a first receiving unit which receives from outside first action instructing information which expresses an instruction regarding an action of said movable unit;
a first transmission unit which transmits to said robot second action instructing information which corresponds to said first action instructing information which is received by said first receiving unit;
a second receiving unit which receives first image information which expresses an image which is transmitted from said robot; and
a second transmission unit which transmits to outside second image information which corresponds to said first image information which is received by said second receiving unit,
the robot further comprises:
a third receiving unit which receives said second action instructing information which is transmitted from said communication apparatus; and
a third transmission unit which transmits said first image information to said communication apparatus based on the image captured by said imaging unit, and
said control unit drives said movable unit based on said second action instructing information which is received by said third receiving unit.

9. A robot system comprising:
a communication apparatus which receives a voice signal and outputs one of a voice and a voice signal which corresponds to the received voice signal; and
a robot;
the robot having:
a movable unit;
a voice input unit;
a voice output unit;
a control unit which drives said movable unit based on the one of the voice and the voice signal outputted from said communication apparatus; and
a voice determining unit which determines a voice to be outputted based on the voice which is inputted at said voice input unit,
wherein said voice output unit outputs the voice which is determined by said voice determining unit;
wherein said robot further comprises an imaging unit, and said control unit drives said movable unit based on an image captured by said imaging unit;
wherein said communication apparatus further comprises:
a first receiving unit which receives from outside first action instructing information which expresses an instruction regarding an action of said movable unit;
a first transmission unit which transmits to said robot second action instructing information which corresponds to said first action instructing information which is received by said first receiving unit;
a second receiving unit which receives first image information which expresses an image which is transmitted from said robot; and
a second transmission unit which transmits to outside second image information which corresponds to said first image information which is received by said second receiving unit,
the robot further comprises:
a third receiving unit which receives said second action instructing information which is transmitted from said communication apparatus; and
a third transmission unit which transmits said first image information to said communication apparatus based on the image captured by said imaging unit, and
said control unit drives said movable unit based on said second action instructing information which is received by said third receiving unit.

10. A robot system comprising:
a communication apparatus which receives a voice signal and outputs one of a voice and a voice signal which corresponds to the received voice signal; and
a robot;
the robot having:
a movable unit;
a voice input unit;
a voice output unit;
a control unit which drives said movable unit based on the one of the voice and the voice signal outputted from said communication apparatus; and
a voice determining unit which determines a voice to be outputted based on the voice which is inputted at said voice input unit,
wherein said voice output unit outputs the voice which is determined by said voice determining unit;
wherein said robot further comprises an imaging unit, and said control unit drives said movable unit based on an image captured by said imaging unit;
further comprising:
a voice existence determining unit which judges whether there is an input voice in predetermined cycles based on a voice signal which is inputted at said voice input unit;
a speaker existence determining unit which judges whether there is a speaker in predetermined cycles based on an image signal which is inputted at said imaging unit; and
a determining unit which determines the current interaction state of said robot based on the judgment result obtained at said voice existence determining unit and the judgment result obtained at said speaker existence determining unit.

11. The robot system according to claim 10, further comprising:
a darkness detector which judges whether it is dark around in predetermined cycles based on the image signal which is inputted at said imaging unit; and
a determining unit which determines the current interaction state of said robot based on the judgment result obtained at said voice existence determining unit, the judgment result obtained at said speaker existence determining unit, and the judgment result obtained at said darkness detector.

12. A robot system comprising:
a communication apparatus which receives a voice signal and outputs one of a voice and a voice signal which corresponds to the received voice signal; and a robot;
the robot having:
a movable unit;
a voice input unit;
a voice output unit;
a control unit which drives said movable unit based on the one of the voice and the voice signal outputted from said communication apparatus; and
a voice determining unit which determines a voice to be outputted based on the voice which is inputted at said voice input unit,
wherein said voice output unit outputs the voice which is determined by said voice determining unit;
wherein said robot further comprises an imaging unit, and said control unit drives said movable unit based on an image captured by said imaging unit;
further comprising:
a first detector which detects a factor which changes an emotion, based on a voice signal which is inputted at said voice input unit;
a second detector which detects a factor which changes an emotion, based on an image signal which is inputted at said imaging unit; and
a determining unit which determines the emotion of the robot based on the judgment results obtained at said first and said second detectors.

13. The robot system according to claim 12, wherein said first detector comprises a unit which judges the voice level of an input voice in predetermined cycles based on the voice signal which is inputted at said voice input unit, and
said second detector comprises a unit which judges whether a face is detected in predetermined cycles based on the image signal which is inputted at said imaging unit.

14. A robot system comprising:
a communication apparatus which receives a voice signal and outputs one of a voice and a voice signal which corresponds to the received voice signal; and
a robot;
the robot having:
a movable unit;
a voice input unit;
a voice output unit;
a control unit which drives said movable unit based on the one of the voice and the voice signal outputted from said communication apparatus; and
a voice determining unit which determines a voice to be outputted based on the voice which is inputted at said voice input unit,
wherein said voice output unit outputs the voice which is determined by said voice determining unit;
wherein said robot further comprises an imaging unit, and said control unit drives said movable unit based on an image captured by said imaging unit; further comprising:
an emotion determining unit which determines the emotion of the robot based on external stimulation;
a state determining unit which determines the current interaction state of said robot based on external stimulation; and
a reply operation control unit which causes said robot to realize an emotion for the present which is determined by said emotion determining unit and an interactional action for the present which is determined by said state determining unit;
wherein said emotion determining unit comprises:
a first detector which detects a factor which changes an emotion, based on a voice signal which is inputted at said voice input unit;
a second detector which detects a factor which changes an emotion, based on an image signal which is inputted at said imaging unit; and
a determining unit which determines the emotion of the robot based on the judgment results obtained at said first and said second detectors.

15. A robot system comprising:
a communication apparatus which receives a voice signal and outputs one of a voice and a voice signal which corresponds to the received voice signal; and
a robot;
the robot having:
a movable unit;
a voice input unit;
a voice output unit;
a control unit which drives said movable unit based on the one of the voice and the voice signal outputted from said communication apparatus; and
a voice determining unit which determines a voice to be outputted based on the voice which is inputted at said voice input unit,
wherein said voice output unit outputs the voice which is determined by said voice determining unit;
wherein said robot further comprises an imaging unit, and said control unit drives said movable unit based on an image captured by said imaging unit;
further comprising:
an emotion determining unit which determines the emotion of the robot based on external stimulation;
a state determining unit which determines the current interaction state of said robot based on external stimulation; and
a reply operation control unit which causes said robot to realize an emotion for the present which is determined by said emotion determining unit and an interactional action for the present which is determined by said state determining unit;
further comprising:
a voice existence determining unit which judges whether there is an input voice in predetermined cycles based on a voice signal which is inputted at said voice input unit;
a speaker existence determining unit which judges whether there is a speaker in predetermined cycles based on an image signal which is inputted at said imaging unit; and
a determining unit which determines the current interaction state of said robot based on the judgment result obtained at said voice existence determining unit and the judgment result obtained at said speaker existence determining unit.

16. A robot system comprising:
a communication apparatus which receives a voice signal and outputs one of a voice and a voice signal which corresponds to the received voice signal; and
a robot;
the robot having:
a movable unit;
a voice input unit;
a voice output unit;
a control unit which drives said movable unit based on the one of the voice and the voice signal outputted from said communication apparatus; and a voice determining unit which determines a voice to be outputted based on the voice which is inputted at said voice input unit, wherein said voice output unit outputs the voice which is determined by said voice determining unit;

wherein said robot further comprises an imaging unit, and said control unit drives said movable unit based on an image captured by said imaging unit;

further comprising:

a first detector which detects a factor used for selecting the reply operation table, based on a voice signal which is inputted at said voice input unit;

a second detector which detects a factor used for selecting the reply operation table, based on an image signal which is inputted at said imaging unit; and a determining unit which determines the reply operation table based on the judgment results obtained at said first and said second detectors.

17. The robot system according to claim 16, wherein said first detector comprises a unit which judges the voice level of an input voice in predetermined cycles based on the voice signal which is inputted at said voice input unit, and said second detector comprises a unit which judges whether a face is detected in predetermined cycles based on the image signal which is inputted at said imaging unit.

18. A robot system comprising:

a communication apparatus which receives a voice signal and outputs one of a voice and a voice signal which corresponds to the received voice signal; and a robot;

the robot having:

a movable unit;

a voice input unit;

a voice output unit;

a control unit which drives said movable unit based on the one of the voice and the voice signal outputted from said communication apparatus; and a voice determining unit which determines a voice to be outputted based on the voice which is inputted at said voice input unit, wherein said voice output unit outputs the voice which is determined by said voice determining unit;

further comprising:

a reply operation table determining unit which determines the reply operation table of the robot based on external stimulation;

a state determining unit which determines the current interaction state of said robot based on external stimulation; and a reply operation control unit which causes said robot based on the reply operation table for the present which is determined by said reply operation table determining unit and an interactional action for the present which is determined by said state determining unit.

19. The robot system according to claim 18, wherein said reply operation table determining unit comprises:

a first detector which detects a factor which changes a reply operation table, based on a voice signal which is inputted at said voice input unit;

a second detector which detects a factor which changes a reply operation table, based on an image signal which is inputted at said imaging unit; and a determining unit which determines the reply operation table of the robot based on the judgment results obtained at said first and said second detectors.

20. The robot system according to claim 18, further comprising:

a voice existence determining unit which judges whether there is an input voice in predetermined cycles based on a voice signal which is inputted at said voice input unit;

a speaker existence determining unit which judges whether there is a speaker in predetermined cycles based on an image signal which is inputted at said imaging unit; and a determining unit which determines the current interaction state of said robot based on the judgment result obtained at said voice existence determining unit and the judgment result obtained at said speaker existence determining unit.

21. A robot comprising:

a movable unit;

a motor which is disposed to said movable unit;

a drive circuit which drives said motor;

an imaging unit;

an input unit which accepts one of a voice and a voice signal from a communication apparatus of one of a portable telephone and a radio communication unit for communicating with an outside communication device to receive a voice signal and output one of a voice and a voice signal which corresponds to the received voice signal; and a control unit which drives said movable unit based on an evaluation value obtained by calculating the one of the voice and the voice signal accepted at said input unit and an image captured by said imaging unit.

22. The robot according to claim 21, further comprising:

a receiving unit which receives action instructing information which expresses an instruction regarding an action of said movable unit; and a transmission unit which transmits said image information containing an image captured by said imaging unit, wherein said control unit drives said movable unit based on said action instructing information which is received by said receiving unit.

23. The robot according to claim 21 whereby an operation program is acquired to a memory from an external server apparatus through a communication network.

24. The robot according to claim 21, further comprises a programmable controller which can modify by means of program a hardware structure which is for supplying a control signal to said drive circuit.

25. The robot as claimed in claim 21, wherein a portion of the robot has features that correspond to those of a human and said control unit drives said movable unit to operate the robot to perform at least one of the acts of blinking, opening/closing the mouth and nodding.

26. A robot comprising:

a movable unit;

a motor which is disposed to said movable unit;

a drive circuit which drives said motor;

a voice input unit;

a voice output unit;

an input unit which accepts one of a voice and a voice signal from a communication apparatus of one of a portable telephone and a radio communication unit for communicating with an outside communication device to receive a voice signal and output one of a voice and a voice signal which corresponds to the received voice signal;

a control unit which drives said movable unit based on an evaluation value obtained by calculating the one of the voice and the voice signal accepted at said input unit; and a voice determining unit which determines a voice to be outputted based on the voice which is inputted at said voice input unit, wherein said voice output unit outputs the voice determined by said voice determining unit.

27. The robot according to claim 26 further comprising an imaging unit, wherein said control unit drives said movable unit based on an image captured by said imaging unit.

28. The robot according to claim 27, further comprising:

a receiving unit which receives action instructing information which expresses an instruction regarding an action of said movable unit; and a transmission unit which transmits said image information containing an image captured by said imaging unit, wherein said control unit drives said movable unit based on said action instructing information which is received by said receiving unit.

29. The robot according to claim 26 whereby an operation program is acquired to a memory from an external server apparatus through a communication network.

30. The robot according to claim 26, further comprises a programmable controller which can modify by means of program a hardware structure which is for supplying a control signal to said drive circuit.

31. The robot as claimed in claim 26, wherein a portion of the robot has features that correspond to those of a human and said control unit drives said movable unit to operate the robot to perform at least one of the acts of blinking, opening/closing the mouth and nodding.

32. A robot comprising:

a movable unit;

a motor which is disposed to said movable unit;

a drive circuit which drives said motor;

an imaging unit for capturing an image;

a control unit that controls the movable unit to locate a user of the robot at the center of an image on the basis of a captured image;

a receiving unit which receives from an outside device by one of a portable telephone and a radio communication unit action instructing information, which expresses an instruction regarding an action of said movable unit;

said control unit also operating to drive said movable unit based on said action instructing information which is received by said receiving unit; and a transmission unit which transmits by one of a portable telephone or radio communication unit to the outside device said image information containing an image captured by said imaging unit.

33. The robot according to claim 32 whereby an operation program is acquired to a memory from an external server apparatus through a communication network.

34. The robot according to claim 32, further comprises a programmable controller which can modify by means of program a hardware structure which is for supplying a control signal to said drive circuit.

35. A robot comprising:

a movable unit;

a motor which is disposed to said movable unit;

a drive circuit which drives said motor;

a voice output unit;

a receiving unit which receives by one of a portable telephone and a radio communication unit information related to everyday life of a target person from an outside device; and a voice determining unit which determines a voice based on the information received by said receiving unit, wherein said voice output unit outputs the voice determined by said voice determining unit.

36. The robot according to claim 35 whereby an operation program is acquired to a memory from an external server apparatus through a communication network.

37. The robot according to claim 35, further comprises a programmable controller which can modify by means of program a hardware structure which is for supplying a control signal to said drive circuit.

38. A robot comprising:

a movable unit;

a motor which is disposed to said movable unit;

a drive circuit which drives said motor;

a memory unit which stores manipulation history information regarding the history of manipulation given by a target person to an external apparatus; and an operation unit which manipulates said external apparatus based on said manipulation history information stored in said memory unit.

39. The robot according to claim 38, wherein said operation unit performs operations of:

manipulating said external apparatus, when said manipulation history information is information which indicates that information was received from a particular sender approximately at the same time of a day over a couple of days;

causing receipt of information from said particular sender at the time corresponding to said time of a day after said couple of days; and causing transmission of said information which is received, and the robot further comprises:

a receiving unit which receives said information transmitted from said external apparatus; and a voice output unit which outputs a voice based on the information received by said receiving unit.

40. The robot according to claim 38 whereby an operation program is acquired to a memory from an external server apparatus through a communication network.

41. The robot according to claim 38, further comprises a programmable controller which can modify by means of program a hardware structure which is for supplying a control signal to said drive circuit.

* * * * *